(12) United States Patent
Song

(10) Patent No.: US 11,313,723 B2
(45) Date of Patent: Apr. 26, 2022

(54) HYPERSPECTRAL SENSOR

(71) Applicant: ELECTRONICS AND TELECOMMUNICATIONS RESEARCH INSTITUTE, Daejeon (KR)

(72) Inventor: Jung-Ho Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/072,178

(22) Filed: Oct. 16, 2020

(65) Prior Publication Data
US 2021/0278275 A1 Sep. 9, 2021

(30) Foreign Application Priority Data

Mar. 5, 2020 (KR) ........................ 10-2020-0027717

(51) Int. Cl.
| | |
|---|---|
| *G01J 3/18* | (2006.01) |
| *G01J 3/02* | (2006.01) |
| *H04N 5/335* | (2011.01) |
| *G01J 3/28* | (2006.01) |

(52) U.S. Cl.
CPC ................ *G01J 3/18* (2013.01); *G01J 3/0208* (2013.01); *G01J 3/2823* (2013.01); *H04N 5/335* (2013.01); *G01J 2003/2826* (2013.01)

(58) Field of Classification Search
CPC .......... G01J 3/18; G01J 3/0208; G01J 3/2823; G01J 2003/2826
See application file for complete search history.

(56) References Cited

U.S. PATENT DOCUMENTS

| | | | |
|---|---|---|---|
| 8,994,939 B2 | 3/2015 | Herrala | |
| 9,435,689 B2 | 9/2016 | Comstock et al. | |
| 9,581,797 B2 | 2/2017 | Acosta et al. | |
| 10,172,523 B2 | 1/2019 | Islam | |
| 2005/0195484 A1* | 9/2005 | Blais-Ouellette | G02B 5/1828 359/566 |
| 2019/0128733 A1 | 5/2019 | Kang et al. | |
| 2019/0278151 A1 | 9/2019 | Kwon et al. | |

FOREIGN PATENT DOCUMENTS

WO WO-2006068021 A1 * 6/2006 ........... G02B 27/286

OTHER PUBLICATIONS

J.M. Versnel, "Signal intensity enhancement of laser ablated volume holograms" Sep. 4, 2017, Elsevier (Year: 2017).*

(Continued)

*Primary Examiner* — Maurice C Smith
(74) *Attorney, Agent, or Firm* — Rabin & Berdo, P.C.

(57) ABSTRACT

Provided is a hyperspectral sensor including a spectral angle converting unit configured to convert an angle of incident light differently according to a wavelength, a diffraction unit configured to selectively diffract the incident light according to an incident angle and a wavelength, a focusing optics including at least one lens, and configured to collect diffracted light passing through the diffraction unit, and an image sensor configured to acquire an image passing through the focusing optics and formed on a focal plane, wherein the diffraction unit includes a volume Bragg grating having a periodic refractive index distribution therein.

12 Claims, 22 Drawing Sheets

(56) References Cited

OTHER PUBLICATIONS

Zhu, Shanbing, "Optical design of prism-grating-prism imaging spectrometers", SPIE, 2008 (Year: 2008).*
L. Glebov, "High brightness laser design based on volume Bragg gratings," Laser Source and System Technology for Defense and Security II, Proc. SPIE, vol. 6216, p. 621601-1-11, May 12, 2006.
R. Swanson et al., "Anamorphic imaging spectrometer," Infrared Technology and Applications XXXIV, Proc of SPIE, vol. 6940, p. 694010-1-12, Apr. 16, 2008.
S. Barden et al., "Volume-phase holographic gratings and their potential for astronomical applications," Proc SPIE 3353, Optical Astronomical Instrument, 1998.

* cited by examiner

HYPERSPECTRAL SENSOR

CROSS-REFERENCE TO RELATED APPLICATIONS

This U.S. non-provisional patent application claims priority under 35 U.S.C. § 119 of Korean Patent Application No. 10-2020-0027717, filed on Mar. 5, 2020, the entire contents of which are hereby incorporated by reference.

BACKGROUND

The present disclosure herein relates to a hyperspectral sensor, and more particularly, to a hyperspectral sensor including a volume Bragg grating.

In order to detect a dangerous substance, a growth state of an agricultural crop, the flourishing of toxic blue-green algae in lakes or marshes, and the like in a wide area, hyperspectral sensors are used through which the hyperspectral characteristics, in addition to spatial distributions, of the corresponding objects can be understood. Such a hyperspectral sensor is mounted in a piloted airplane or a small unmanned aerial vehicle. When mounted on the small unmanned aerial vehicle, it is advantageous in that the use range becomes large, and thus efforts are made to reduce the size and weight of the hyperspectral sensor.

SUMMARY

The present disclosure provides a miniaturized and simplified hyperspectral sensor.

The objectives of the present disclosure are not limited to the above-described. The objectives not mentioned in the above should be clearly understood by those skilled in the art from description below.

An embodiment of the inventive concept provides a hyperspectral sensor including: a spectral angle converting unit configured to convert an angle of incident light (in other words, to change a propagation angle of the incident light) differently according to a wavelength; a diffraction unit configured to selectively diffract the incident light according to an incident angle and a wavelength; a focusing optics including at least one lens, and configured to collect diffracted light passing through the diffraction unit; and an image sensor configured to acquire an image passing through the focusing optics and formed on a focal plane, wherein the diffraction unit includes a volume Bragg grating having a periodic refractive index distribution therein.

In an embodiment, the spectral angle converting unit may include at least one prism.

In an embodiment, the spectral angle converting unit may include a diffraction grating, wherein the diffraction grating has a periodic refractive index distribution therein.

In an embodiment, the diffraction grating may include first parts having a film shape and second parts between the first parts, wherein the first parts and the second parts are disposed alternately, an average refractive index of the first parts is greater than an average refractive index of the second parts, a refractive index difference between the first parts and the second parts is equal to or greater than 0.01, and a length of the diffraction grating may be equal to or smaller than 50 µm.

In an embodiment, the volume Bragg grating may include first parts having a film shape and second parts between the first parts, wherein the first parts and the second parts are disposed alternately, and an average refractive index of the first parts is greater than an average refractive index of the second parts.

In an embodiment, a refractive index difference between the first parts and the second parts may be equal to or smaller than $10^{-3}$, and a length of the volume Bragg grating may be equal to or greater than 0.5 mm.

In an embodiment, the spectral angle converting unit may include a diffraction grating, and the diffraction grating and the volume Bragg grating may be disposed parallel to each other.

In an embodiment, the diffraction grating may include periodic protruding parts on a surface thereof.

In an embodiment, the hyperspectral sensor may scan an image of a space while proceeding in one direction, and a wavelength dependent aiming angle error occurring in the hyperspectral sensor may be corrected after the scanning.

In an embodiment, the hyperspectral sensor may further include a duct having a hollow hexahedral shape and configured to cover one side surface of the spectral angle converting unit.

In an embodiment of the inventive concept, a hyperspectral sensor include: a spectral angle converting unit including at least one among a prism or a diffraction grating; an image sensor spaced apart from the spectral angle converting unit; a diffraction unit disposed between the spectral angle converting unit and the image sensor, and including a volume Bragg grating; and a focusing optics disposed between the diffraction unit and the image sensor, and including a lens or a reflective mirror, wherein the volume Bragg grating has a periodic refractive index distribution therein.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
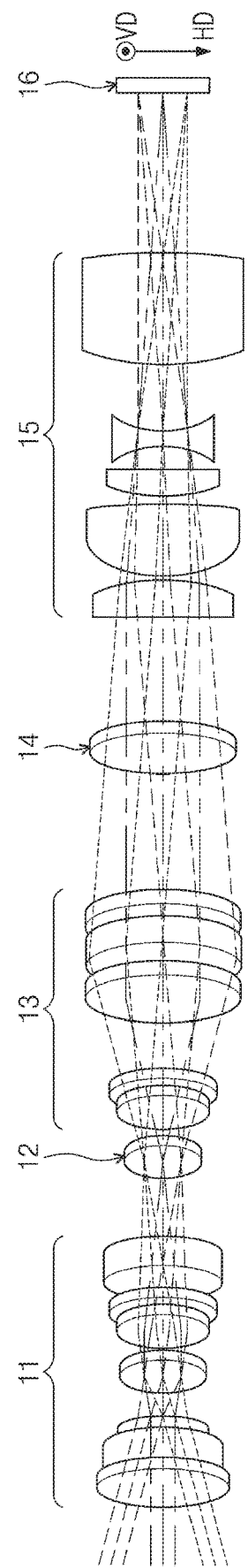
FIG. 1A is a diagram for explaining the structure of a typical hyperspectral sensor in the spatial perspective.

The embodiments of the present disclosure will now be described with reference to the accompanying drawings for sufficiently understating a configuration and effects of the inventive concept.

However, the inventive concept is not limited to the following embodiments and may be embodied in different ways, and various modifications may be made thereto. The embodiments are just given to provide complete disclosure of the inventive concept and to provide thorough understanding of the inventive concept to those skilled in the art. In the accompanying drawings, the sizes of the elements may be greater than the actual sizes thereof, for convenience of description, and the scales of the elements may be exaggerated or reduced.

The terminology used herein is for the purpose of describing particular embodiments only and is not intended to limit the scope of the present disclosure. Unless otherwise defined, all terms used herein have the same meaning as commonly understood by one of ordinary skill in the art to which this invention pertains.

As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

It will be understood that, in the present specification, when a layer is referred to as being "on" another layer, it may indicate that the layer is directly on the other layer or that another layer(s) is present therebetween.

Although the terms first, second, third etc. may be used herein to describe various regions, and films (or layers) etc., the regions and films (or layers) are not to be limited by the terms. The terms may be used herein only to distinguish one region or layer) from another region or layer. Therefore, a part referred to as a first part in one embodiment can be referred to as a second part in another embodiment. An embodiment described and exemplified herein includes a complementary embodiment thereof. Like reference numerals refer to like elements throughout.

Hereinafter, embodiments of a hyperspectral sensor according to the inventive concept will be described in detail with reference to the accompanying drawings.

Figure 1B:
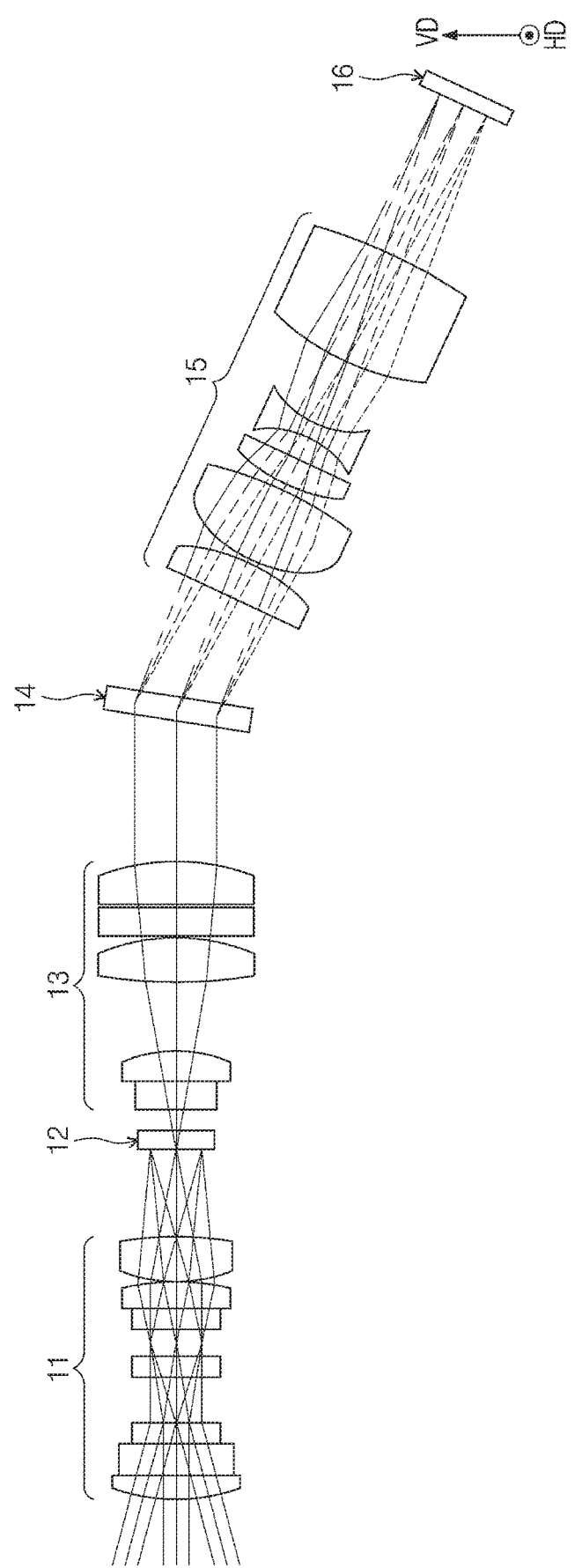
FIG. 1B is a diagram for explaining the structure of the typical hyperspectral sensor in the spectral perspective.

FIG. 1A is a diagram for explaining the structure of a typical hyperspectral sensor in the spatial perspective. FIG. 1B is a diagram for explaining the structure of the typical hyperspectral sensor in the spectral perspective. In FIG. 1A, different kinds of lines mean light beams to be incident at different angles, and in FIG. 1B, different kinds of lines mean light beams having different wavelengths.

With reference to FIGS. 1A and 1B, the hyperspectral sensor includes a fore optics 11, a slit 12, a collimator 13, a diffraction grating 14, a focusing optics 15, and an image sensor 16. The focal plane of the fore optics 11 is positioned on the slit 12, and the focal plane of the focusing optics 15 is positioned on the image sensor 16. The slit 12 has a stripe shaped opening extending in a horizontal direction HD. Specifically, the slit 12 extends in the horizontal direction HD, and has a thin width in a vertical direction VD. Referring to FIG. 1B, the slit 12 transmits only light beams focused thereon among light beams incident at different angles from the vertical direction VD. Accordingly, the slit 12 transmits an image of the stripe shape, and filters out other light beams.

The light beams passing through the slit 12 are made to travel in parallel towards the diffraction grating 14 by the collimator 13. The diffraction grating 14 disperses the incident light beams at different angles according to the wavelengths. The diffracted light beams are focused on the image sensor 16 by the focusing optics 15. The light beams reaching the image sensor 16 are focused at different positions in the vertical direction VD on the image sensor 16 according to the wavelengths, and indicate the wavelengths of the light beams.

The typical hyperspectral sensor may indicate wavelength information and spatial information from coordinates of an image generated on the image sensor 16. The typical hyperspectral sensor uses a push broom manner in which the entire image of a region is obtained by scanning the sensor in the vertical direction VD.

Figure 1C:
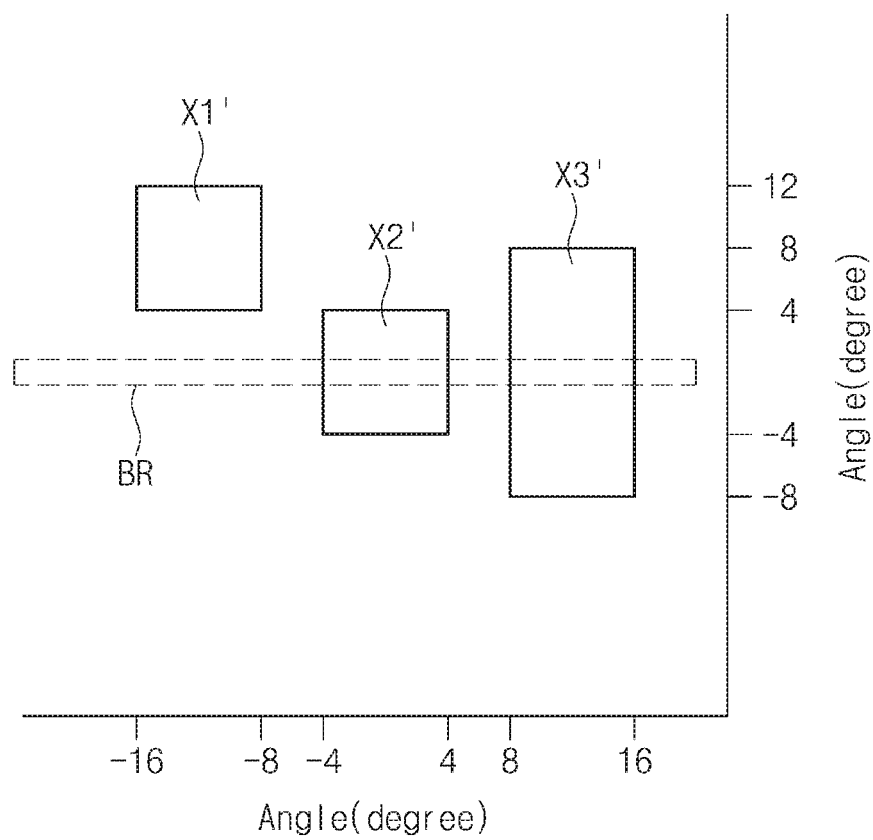
FIGS. 1C and 1D are conceptual views for explaining an image measured using the typical hyperspectral sensor.
Figure 1D:
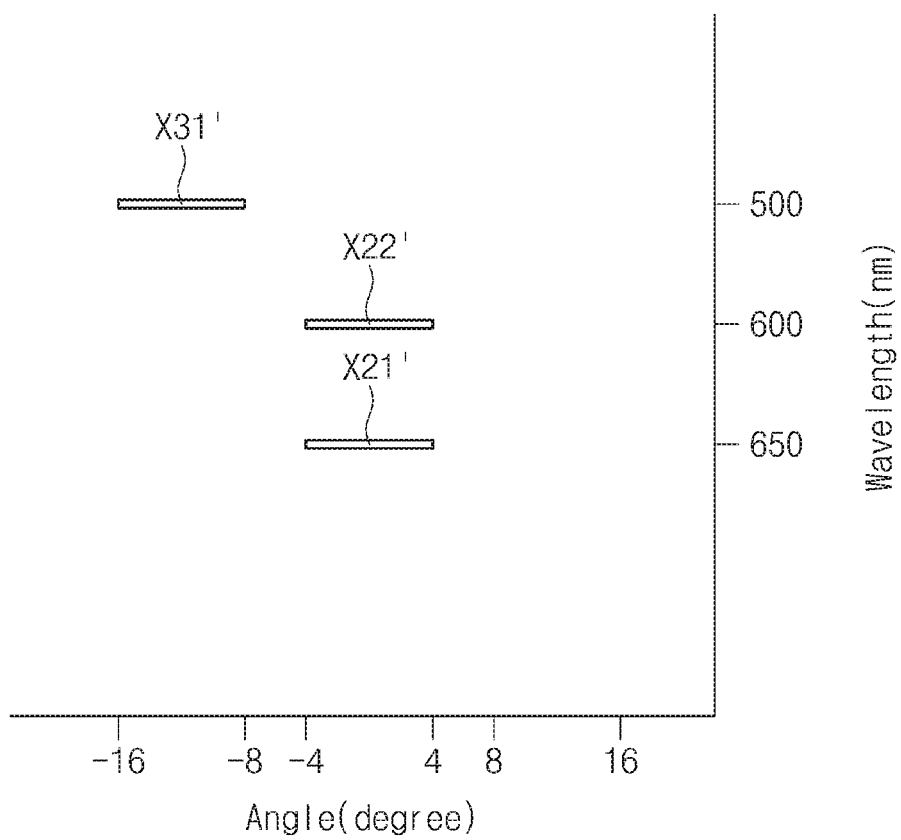

FIGS. 1C and 1D are conceptual views for explaining an image measured using the typical hyperspectral sensor. In detail, FIG. 1C illustrates images passing through the fore optics 11 and focused on the slit 12, and FIG. 1D illustrates images passing through the fore optics 11, the slit 12, the collimator 13, the diffraction grating 14, and the focusing optics 15, and then focused on the image sensor 16. Hereinafter, light incident in a direction perpendicular to the horizontal direction HD and the vertical direction VD is defined as being incident at a reference degree 0.

Referring to FIGS. 1A, 1B, and 1C, a first image X1' may be an image of light incident in ranges of about −16 degrees to about −8 degrees in the horizontal direction HD, and about +4 degrees to about +12 degrees in the vertical direction VD. In addition, the first image X1' may be the image of the incident light having about a 700-nm wavelength. A second image X2' may be an image of light incident in ranges of about −4 degrees to about +4 degrees in the horizontal direction HD, and about −4 degrees to about +4 degrees in the vertical direction VD. In addition, the second image X2' may be the image of incident light having about 600-nm and about 650-nm wavelengths. A third image X3' may be an image of light incident in ranges of about +8 degrees to about +16 degrees in the horizontal direction HD, and about −8 degrees to about +8 degrees in the vertical direction VD. In addition, the third image X3' may be the image of incident light having about a 500-nm wavelength. The entire space may be scanned while the entirety of the hyperspectral sensor moves in the vertical direction VD.

Referring to FIGS. 1A to 1D, the light beams incident in a range BR of about 0 degree in the vertical direction VD may pass through the slit 12 to reach the image sensor 16. Accordingly, the incident light having the incident angle corresponding to the second image X2' and having the about 650-nm wavelength may pass through the slit 12 to form a first spectral image X21' on the image sensor 16. In addition, the incident light having the incident angle corresponding to the second image X2' and having the about 600-nm wavelength may pass through the slit 12 to form a second spectral image X22' on the image sensor 16. In addition, the incident light having the incident angle corresponding to the third image X3' and having the about 500-nm wavelength may pass through the slit 12 to form a third spectral image X31' on the image sensor 16. The incident light having the incident angle corresponding to the first image X1' and the about 700-nm wavelength may not pass the slit 12. The incident light having the incident angle corresponding to the first image X1' may not reach the image sensor 16.

Figure 1E:
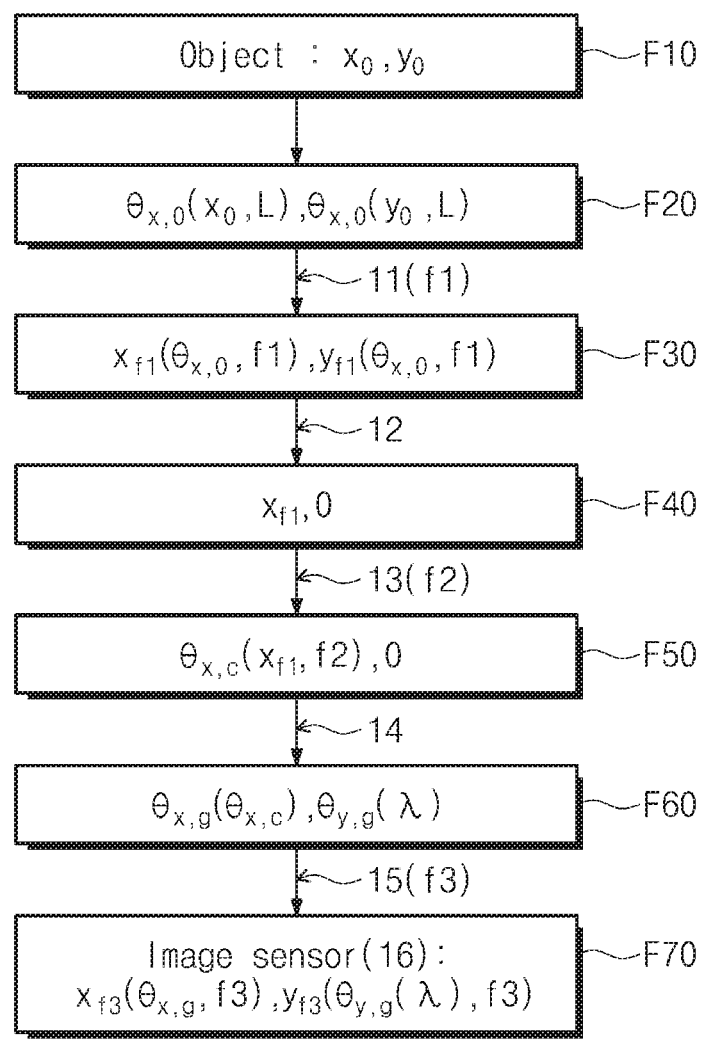
FIG. 1E is a flowchart for explaining the operation of the typical hyperspectral sensor.

FIG. 1E is a flowchart for explaining the operation of the typical hyperspectral sensor.

Referring to FIGS. 1A, 1B, and 1E, light emitted from a detection object may include coordinate information F10 about the detection object. The coordinate information F10 about the detection object is expressed with an x coordinate and a y coordinate. The light emitted from the detection object is incident to the fore optics 11 and the coordinate information F10 of the detection object is converted to pieces of angle information F20 having the coordinate information F10 as a variable. Then, the light passing through the fore optics 11 is represented with pieces of coordinate information F30 having one among the pieces of angle information F20 and the focal distance f1 of the fore optics 11 as variables. Then, the light passing through the slit 12 is represented only with x coordinate information F40 having the focal distance f1 of the fore optics 11 as a variable. Y coordinate among the pieces of coordinate information F30 is fixed as 0 while passing through the slit 12. Then, the light passing through the collimator 13 is represented with angle information F50 having the focal distance f2 of the collimator 13 and x coordinate information F40 about the light passing through the slit 12 as variables. Then, the light passing through the diffraction grating 14 is represented with pieces of angle information F60 having the x coordination information F50 and wavelength information (λ) of the light passing through the collimator 13 as variables. Finally, the light passing through the focusing optics 15 to reach the image sensor 16 is represented with pieces of coordinate information F70 having one among the pieces of angle information F60 and the focal distance f3 of the focusing optics 15 as variables. In other words, the image shown on the image sensor 16 may include information about the three focal distances f1, f2, and f3.

As aforementioned, since including many components having the focal distances, the typical hyperspectral sensor has a large size. The structure for correcting an aberration generated in each of the components having the focal distances is complicated, and thus is hard to be manufactured.

Figure 2A:
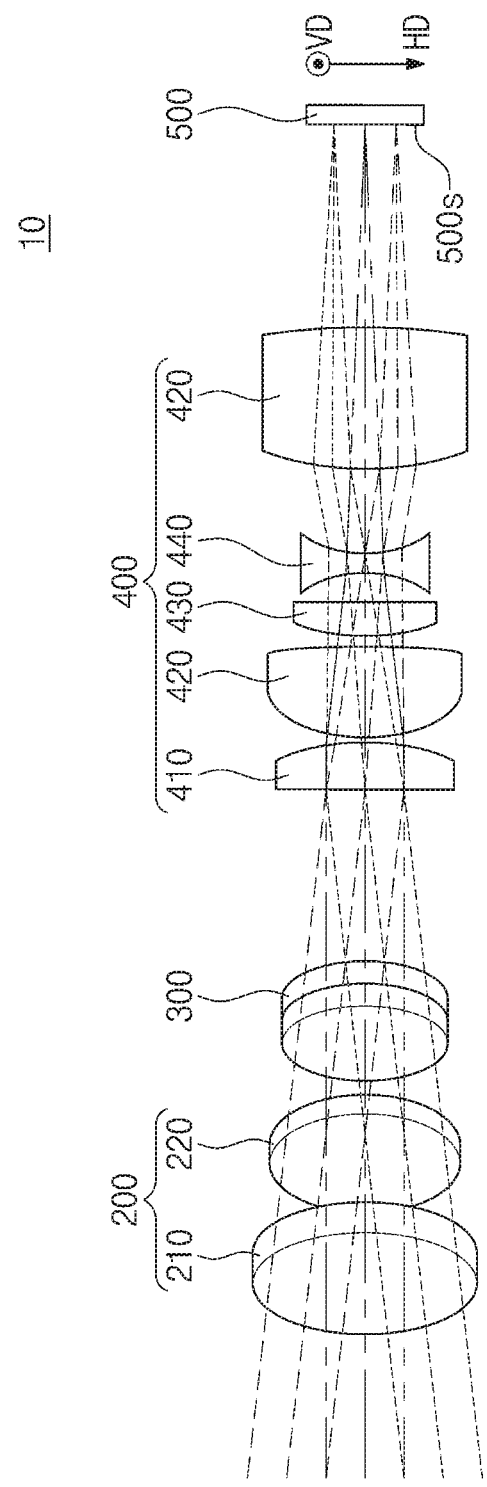
FIG. 2A is a diagram for explaining the structure of a hyperspectral sensor according to embodiments of the inventive concept in the spatial perspective.
Figure 2B:
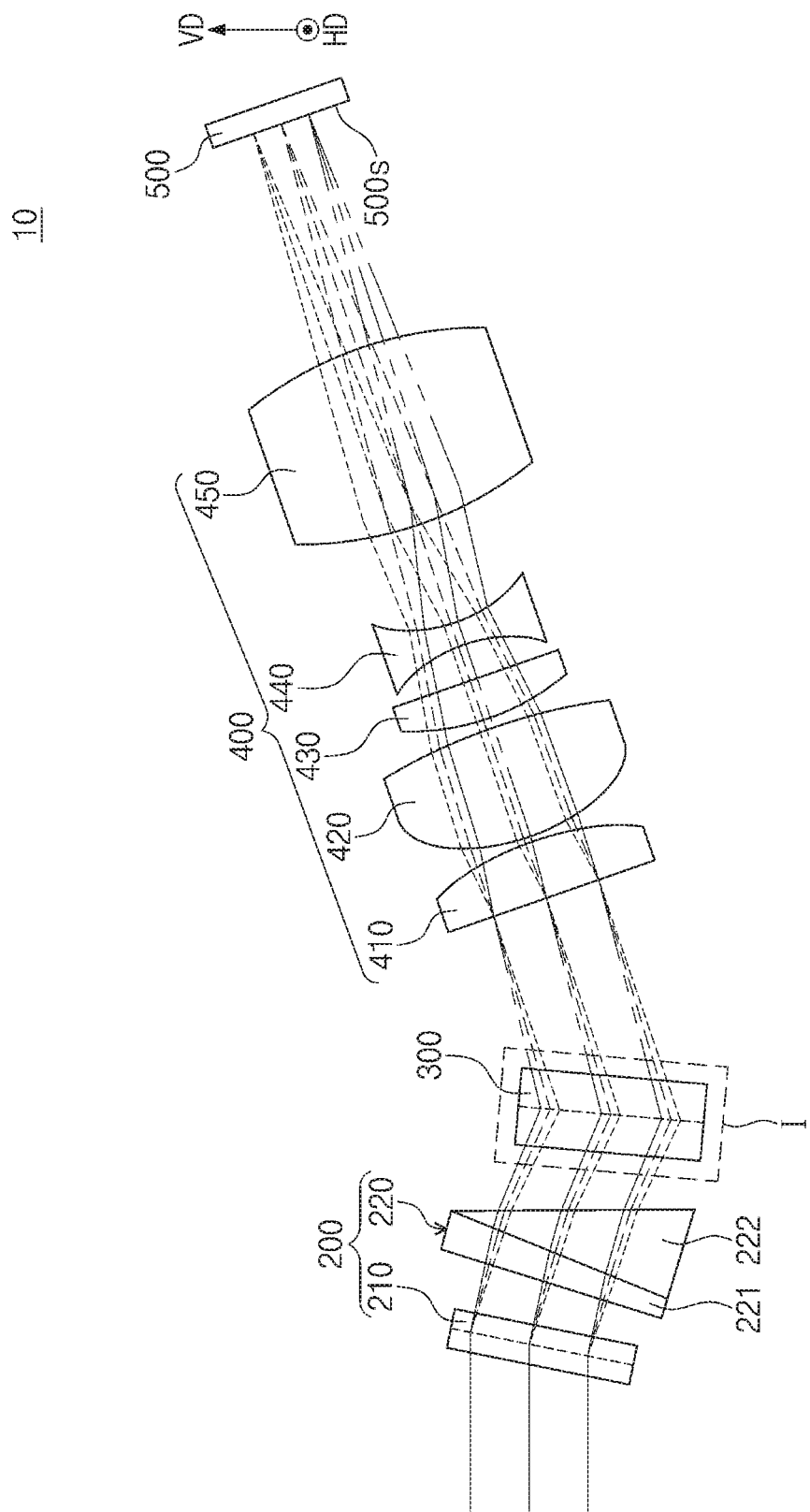
FIG. 2B is a diagram for explaining the structure of a hyperspectral sensor according to embodiments of the inventive concept in the spectral diagram.

FIG. 2A is a diagram for explaining the structure of a hyperspectral sensor according to embodiments of the inventive concept in the spatial perspective. FIG. 2B is a diagram for explaining the structure of a hyperspectral sensor according to embodiments of the inventive concept in the spectral perspective. In FIG. 2A, different kinds of lines mean light beams to be incident at different angles, and in FIG. 2B, different kinds of lines mean light beams having different wavelengths.

Referring to FIGS. 2A and 2B, a hyperspectral sensor 10 according to an embodiment of the inventive concept may include a spectral angle converting unit 200, a first diffraction grating 300, focusing optics 400, and an image sensor 500.

More specifically, the spectral angle converting unit 200 may include optical elements having different degrees of changing a propagation angle of light according to a wavelength. For example, the spectral angle converting unit 200 may include at least one among a second diffraction grating 210 and a prism 220. The spectral angle converting unit 200 may perform conversion so that light propagates at an angle for satisfying a Bragg condition for each wavelength. The second diffraction grating 210 may be, for example, a surface diffraction grating including periodic protruding parts on the surface. As another example, the second diffraction grating 210 may be a volume Bragg grating to be described later. Unlike the illustrated, the second diffraction grating 210 may be omitted.

The prism 220 may be disposed between the second diffraction grating 210 and the first diffraction grating 300. The prism 220 may specifically include a first sub-prism 221 and a second sub-prism 222. The first and second sub-prisms 221 and 222 may contact each other. Unlike the illustrated, the prism 220 may include two or more sub-prisms. In addition, unlike the illustrated, the sub-prisms may be spaced apart from each other.

The first diffraction grating 300 may be disposed between the prism 220 and the focusing optics 400. The first diffraction grating 300 may be, for example, a volume Bragg grating. The Bragg grating is a diffraction grating having a periodic refractive index distribution, and the volume Bragg grating is a Bragg grating having a periodic refractive index distribution inside a transparent material. The volume Bragg grating may be referred to as a bulk Bragg grating or a volume holographic grating. The specific configuration of the first diffraction grating 300 will be described later with reference to FIG. 4.

The focusing optics 400 may be disposed between the first diffraction grating 300 and an image sensor 500. The focusing optics 400 may include first to fifth lenses 410, 420, 430, 440, and 450. The first to fifth lenses 410, 420, 430, 440, and 450 may have various shapes and variable curvatures without being limited to the illustrated shape and the radius of curvature. In addition, the number of lenses forming the focusing optics 400 may be greater or smaller than 5. However, this is just exemplary, and the inventive concept is not limited thereto. Unlike the illustrated, the focusing optics 400 may be composed of a plurality of reflection mirrors or a combination of lenses and reflection mirrors.

The image sensor 500 may be disposed at which the focal plane of the focusing optics 400 is positioned. The central axis of the image sensor 500 may be substantially the same as the central axis of the focusing optics 400. The image sensor 500 may be spaced apart from the focusing optics 400. The image sensor 500 may have, for example, a rectangular plate shape extending in the horizontal direction HD and the vertical direction VD. The image sensor 500 may include, for example, a semiconductor optical sensor such as CCD, or CMOS, or a nano-optoelectronic element.

Figure 2C:
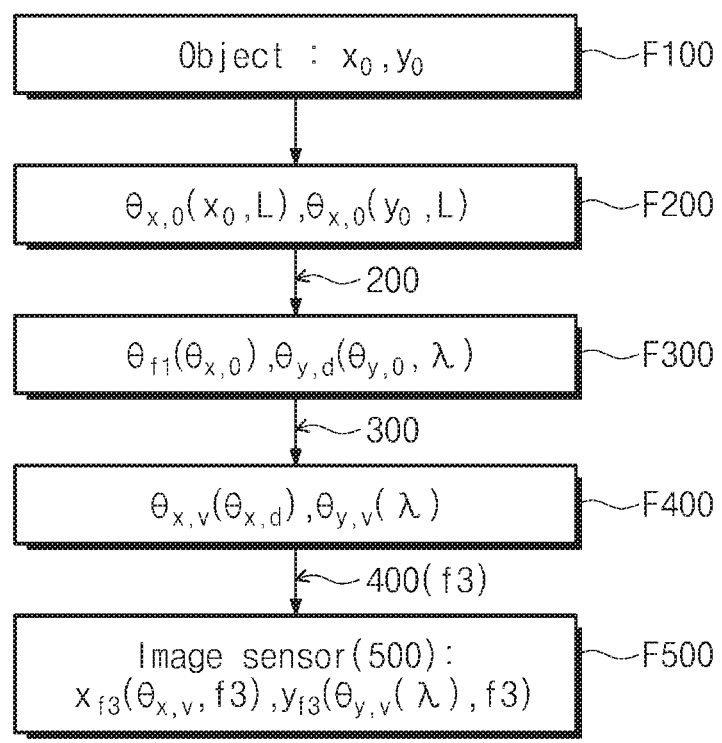
FIG. 2C is a flowchart for explaining the operation of a hyperspectral sensor according to embodiments of the inventive concept.

FIG. 2C is a flowchart for explaining the operation of a hyperspectral sensor according to embodiments of the inventive concept.

Referring to FIGS. 2A, 2B, and 2C, light emitted from a detection object may include coordinate information F100 about the detection object. The coordinate information F100 about the detection object is represented with an x coordinate and a y coordinate. The light emitted from the detection object may be incident to the spectral angle converting unit 200 and the coordinate information F100 of the detection object is converted to pieces of angle information F200 having the coordinate information F100 as a variable. Then, the light passing through the spectral angle converting unit 200 may be represented with pieces of angle information F200 about light incident to the spectral angle converting unit 200 and pieces of angle information F300 having wavelength information (λ) about the light as a variable. Only a component including information about the y coordinate among the pieces of angle information F300 about the light passing through the spectral angle converting unit 200 may include the wavelength information (λ) about the light as a variable. Then, the first diffraction grating 300 may filter out only light having a specific y-coordinate value. In other words, the first diffraction grating 300 may perform the substantially same role as the slit 12 (see FIGS. 1A and 1B) of the typical hyperspectral slit. Finally, the light passing through the focusing optics 400 to reach the image sensor 500 may be represented with pieces of angle information F400 about the light passing through the first diffraction grating 300 and pieces of coordinate information F500 having the focal distance f3 of the focusing optics 400 as a variable. A y coordinate of the image on the image sensor 500 may include the wavelength information λ about the light. In addition, unlike the typical spectral sensor, the image on the image sensor 500 may only include information about one focal distance f3. Accordingly, the hyperspectral sensor according to an embodiment of the inventive concept may have an entirely small size, easily correct an aberration, and be easy to be manufactured.

Figure 3:
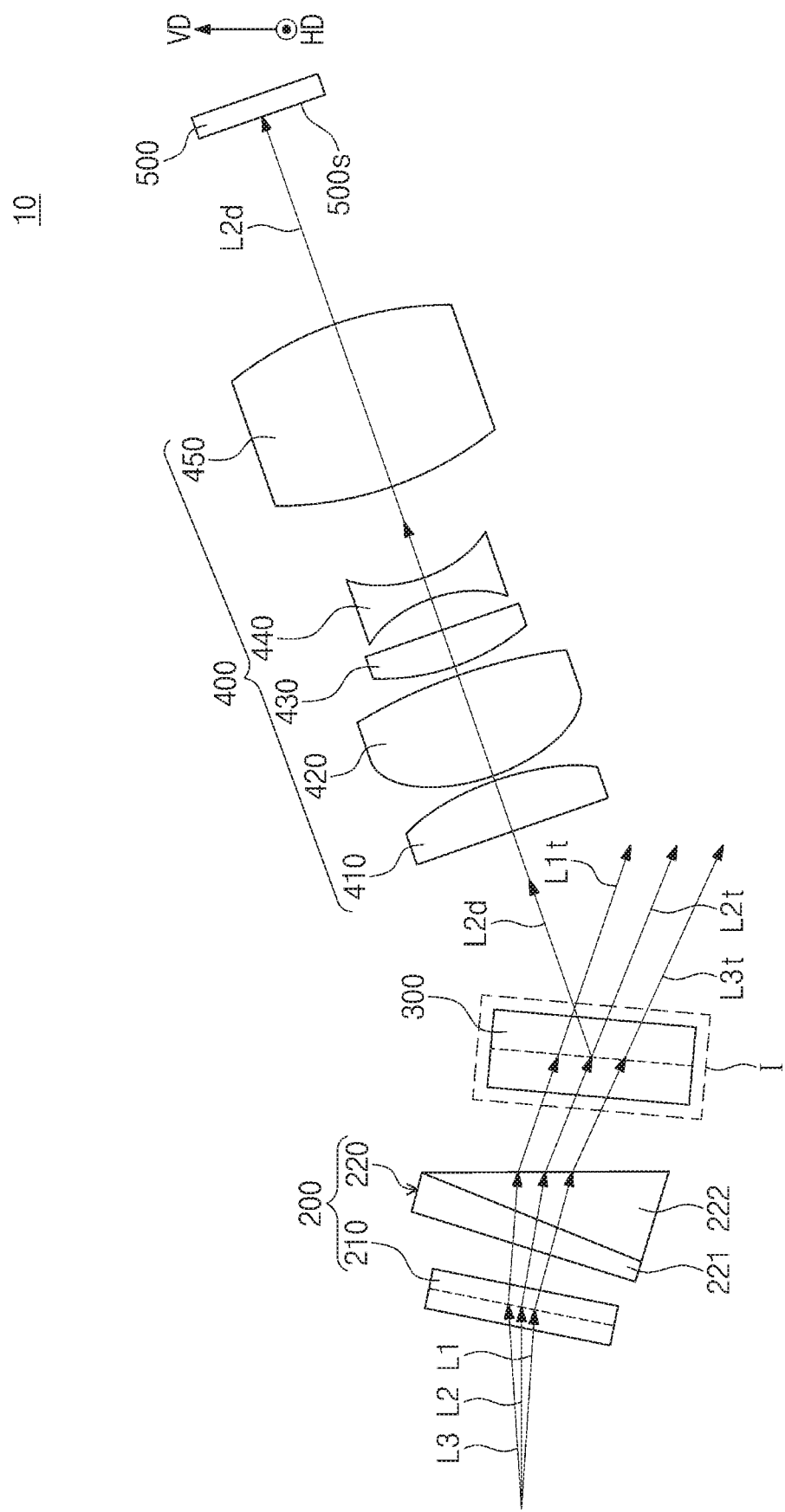
FIGS. 3, 8A, 8B, 10, 11A, and 11B are spectral diagrams for explaining the structure of a hyperspectral sensor according to embodiments of the inventive concept.

FIG. 3 is a spectral diagram for explaining the structure of a hyperspectral sensor according to embodiments of the inventive concept.

Referring to FIG. 3, first light L1, second light L2, and third light L3 may be incident towards the spectral angle converting unit 200. The first light L1, the second light L2, and the third light L3 may be incident at different angles from the vertical direction VD. The first light L1, the second light L2, and the third light L3 may include parallel light beams having the same wavelength. FIG. 3 illustrates only central light rays among the parallel light beams for the convenience of description. The first light L1, the second light L2, and the third light L3 may be incident to the first diffraction grating 300 at different angles through the spectral angle converting unit 200. A portion of the light incident to the first diffraction grating 300 may be diffracted, and the other portion may be transmitted through the first diffraction grating 300. For example, a portion of the second light L2 incident to the first diffraction grating 300 may be diffracted as second diffraction light L2d, and the other portion of the second light L2 may be transmitted as second transmission light L2t. On the contrary, the first light L1 and the third light L3 may be respectively transmitted as first transmission light L1t and third transmission light L3t with negligible portion of the diffraction. The presence or absence of strong diffraction may be caused by the incident angle to the first diffraction grating 300. Accordingly, the hyperspectral sensor 10 according to an embodiment of the inventive concept may filter out the incident light without a slit 12. Consequently, the hyperspectral sensor 10 according to an embodiment of the inventive concept may be simply formed with a small size without complicated components such as the slit 12 and the collimator 13 (see FIGS. 1A and 1B) for controlling optical paths.

The second diffraction light L2d diffracted by the first diffraction grating 300 may pass through the focusing optics 400. The second diffraction light L2d passing through the focusing optics 400 may reach the image sensor 500. The second diffraction light L2d reaching the top surface 500s of the image sensor 500 may form an image including wavelength information and spatial information.

Figure 4:
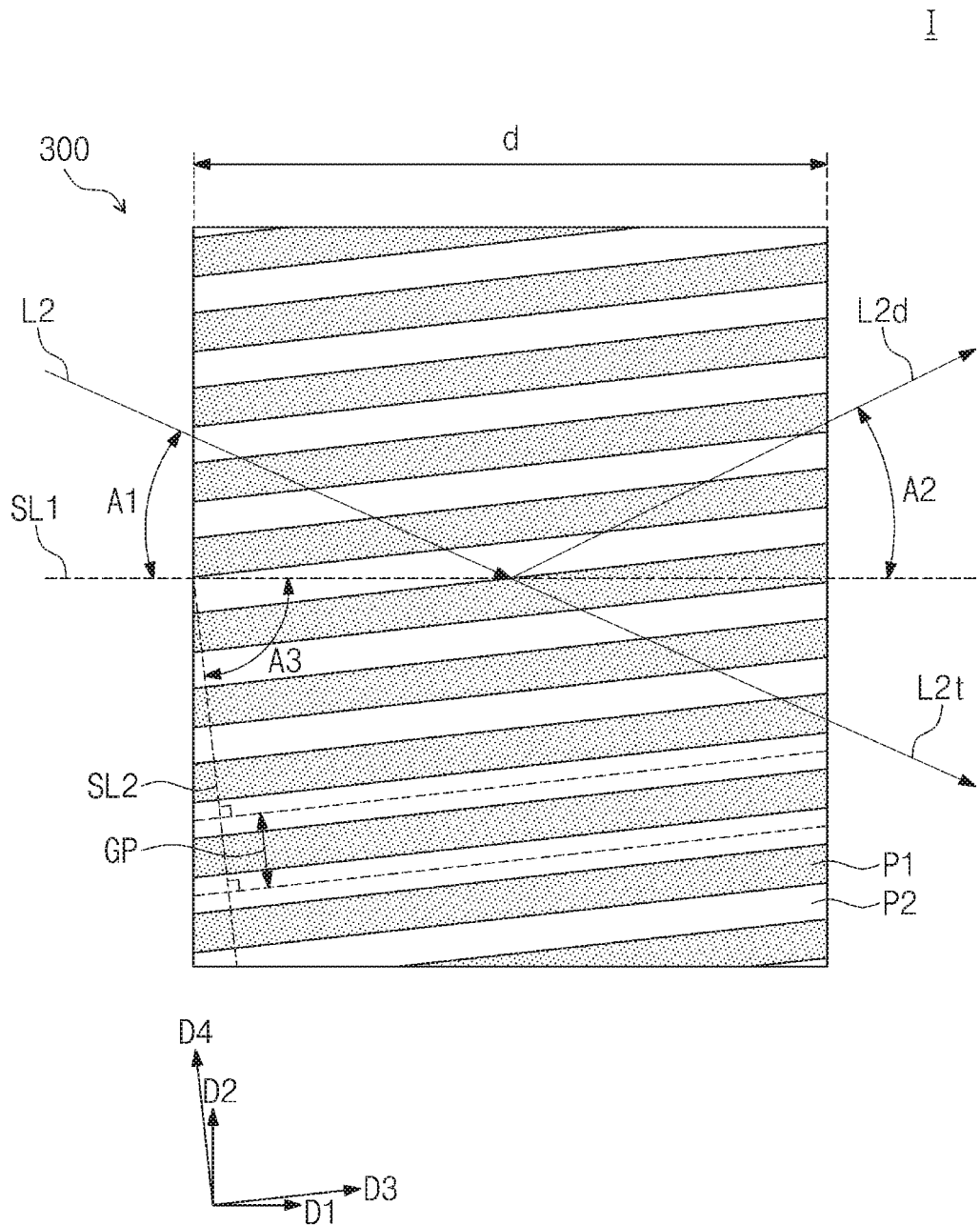
FIG. 4 is an enlarged sectional view for explaining a volume Bragg grating of the hyperspectral sensor according to FIG. 3, and corresponds to a part I of FIG. 3.

FIG. 4 is an enlarged sectional view for explaining a volume Bragg grating of the hyperspectral sensor according to FIG. 3, and corresponds to a part I of FIG. 3.

Referring to FIG. 4, the first diffraction grating 300 may have, for example, a rectangular parallelepiped shape extending in a first direction D1 and a second direction D2 intersecting with the first direction D1. The first direction D1 and the second direction D2 may be, for example, perpendicular to each other. The length d in the first direction D1 of the first diffraction grating 300 may be shorter than the length in the second direction D2 of the first diffraction grating 300. The inside of the first diffraction grating 300 may have a periodic refractive index distribution. More specifically, the first diffraction grating 300 may include first parts P1 and second parts P2 that are alternately repeated. More specifically, one of the first parts P1 is sandwiched between adjacent two ones of the second parts P2. The first parts P1 and the second parts P2 may have a film (or layer) shape (a band shape from the planar point of view). For example, the first parts P1 and the second parts P2 may respectively have continuous refractive index distributions. The refractive indexes of the first parts P1 may be greater than those of the second parts P2. For example, the refractive index of the first parts P1 and the refractive index of the second parts P2 may respectively mean average refractive indexes of the parts. The first parts P1 and the second parts P2 may extend in a third direction D3 inside the first diffraction grating 300. The third direction D3 may intersect at a certain angle with the first direction D1.

An angle formed by a first reference line SL1 extending in the first direction D1 and the second light L2 may be defined as a first angle A1, and an angle formed by the first reference line SL1 and the second diffraction light L2d may be defined as a second angle A2. In addition, an angle formed by the first reference line SL1 and a second reference line SL2 extending in a fourth direction D4, which intersects with the second direction D2, may be defined as a third angle A3. The fourth direction D4 may intersect by a certain angle with the first direction D2. The fourth direction D4 may be, for example, a direction perpendicular to the third direction D3 in which the first parts P1 and the second parts P2 extend. In addition, the distances of the central lines of the second parts P2, which are adjacent to each other, to the fourth direction D4 may be defined as grating periods GP. The central lines of the second parts P2 may have the same distance to the adjacent first parts P1 and extend in the third direction D3.

For example, the second light L2 in FIG. 3 may be incident to the first diffraction grating 300. While the second light L2 passes through the first diffraction grating 300, a portion thereof may propagate as the second diffraction light L2d, and the other portion may propagate as the second transmission light L2t. Hereinafter, for convenience of explanation, the third angle A3 is assumed to be a right angle. In other words, it is assumed that the third direction D3 is substantially the same direction as the first direction D1, and the fourth direction D4 is substantially the same direction as the second direction D2. When a case in which the first angle A1 and the second angle A2 are the same is assumed to be a Bragg condition, the diffraction efficiency may become the maximum. When this Bragg condition is substituted to a typical grating equation as Equation 1, the first angle A1 satisfying the Bragg condition may be obtained.

$$m\lambda = \Lambda(\sin(\alpha)+\sin(\beta)) \qquad (1)$$

where m is a diffraction order, $\lambda$ is a wavelength of the second light L2, $\Lambda$ is a grating period GP, a is the first angle A1, and $\beta$ is the second angle A2. When the wavelength of the second light L2 and the grating period GP are determined, the first angle A1 may be calculated under a condition that the first angle A1 is the same as the second angle A2.

Furthermore, the diffraction efficiency may be proportional to the square of a sine function having, as factors, the difference between the refractive indexes of the first parts P1 and the second parts P2, and the length d of the first diffraction grating 300 in the first direction D1. In other words, the first diffraction grating 300 may be designed through which the maximum diffraction efficiency is obtained by adjusting the difference between the refractive indexes of the first parts P1 and the second parts P2, and the length d of the first diffraction grating 300 in the first direction D1. Hereinafter, $\Delta$n means the difference between the refractive indexes of the first parts P1 and the second parts P2.

For example, when the first diffraction grating 300 is formed of dichromated gelatin (DCG), the maximum diffraction efficiency may be obtained through the first diffraction grating 300 when $\Delta$n is about 0.01 or greater, and the length d of the first diffraction grating 300 in the first direction D1 is about 50 μm or smaller. Furthermore, the maximum diffraction efficiency may be obtained through the first diffraction grating 300, when $\Delta$n is about 0.02 to 0.1, and the length d of the first diffraction grating 300 in the first direction D1 is about 4 μm to about 20 μm.

For another example, when the first diffraction grating 300 is formed of photo-thermo-refractive (PTR) glass, the maximum diffraction efficiency may be obtained through the first diffraction grating 300 when $\Delta$n is about $10^{-3}$ or smaller, and the length d of the first diffraction grating 300 in the first direction D1 is about 0.5 mm or greater. Furthermore, the maximum diffraction efficiency may be obtained through the first diffraction grating 300, when $\Delta$n is about $10^{-3}$ to about $10^{-5}$, and the length d of the first diffraction grating 300 in the first direction D1 is about 0.5 mm to about 5 mm.

Figure 5A:
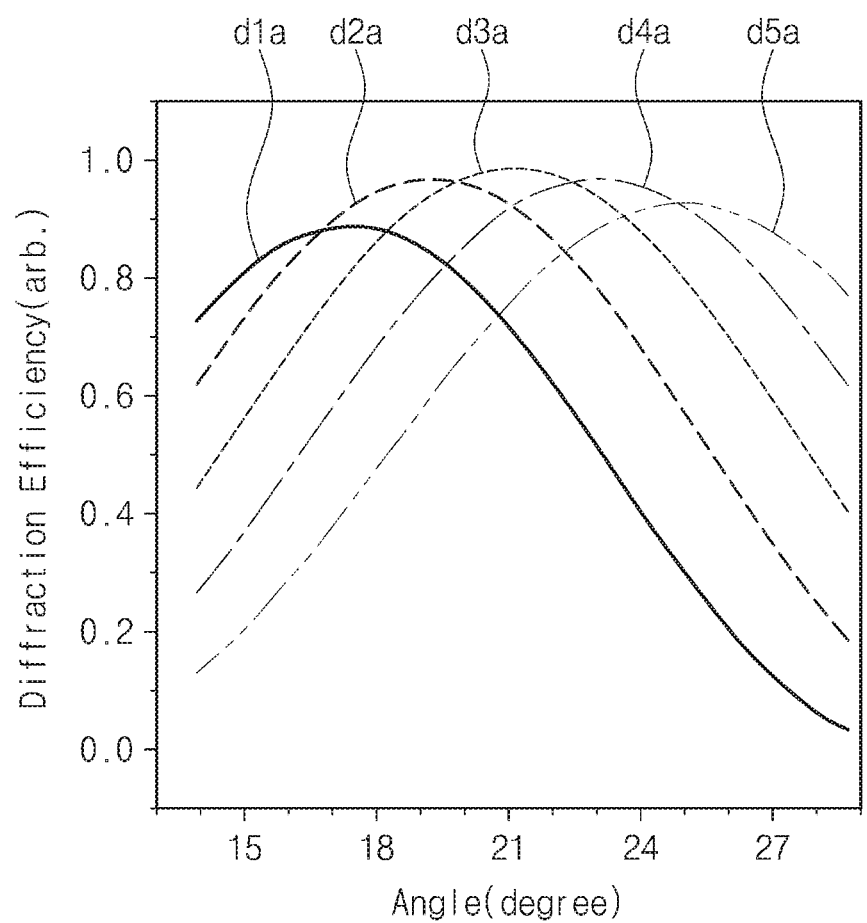
FIGS. 5A and 5B are graphs for comparing diffraction efficiencies of diffraction gratings usable for a hyperspectral sensor according to embodiments of the inventive concept, according to a wavelength and an incident angle of an incident light.
Figure 5B:
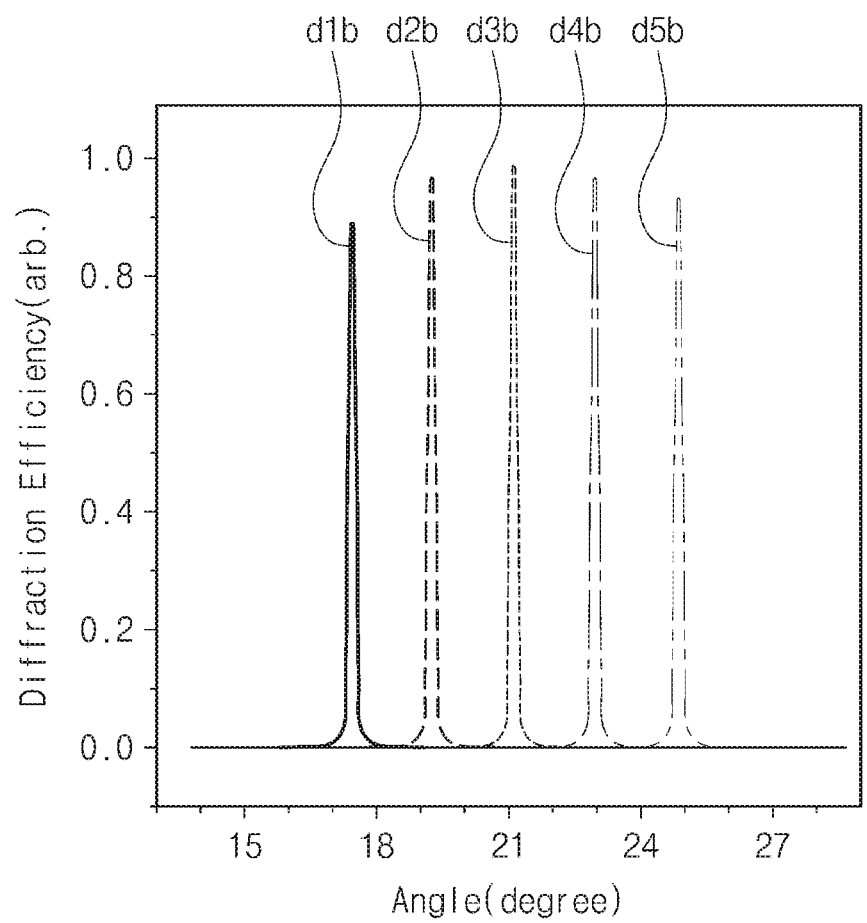

FIGS. 5A and 5B are graphs for comparing diffraction efficiencies of a volume Bragg grating in the hyperspectral sensor according to embodiments of the inventive concept, according to a wavelength and an incident angle of an incident light.

Referring to FIG. 5A, the curves in the graphs represent relative magnitudes of the diffraction efficiency according to the wavelength and incident angle of incident light when the thickness of the volume Bragg grating is several μm to hundreds μm. More specifically, the curves in the graphs may mean relative magnitudes of the diffraction efficiencies when the wavelength of the incident light is about 500 nm d1a, 550 nm d2a, 600 nm d3a, 650 nm d4a, and 700 nm d5a.

Referring to FIG. 5B, the curves in the graphs represent relative magnitudes of the diffraction efficiency according to the wavelength and incident angle of incident light when the thickness of the volume Bragg grating is several mm. More specifically, the curves in the graphs may mean relative magnitudes of the diffraction efficiencies when the wavelength of the incident light is about 500 nm d1b, 550 nm d2b, 600 nm d3b, 650 nm d4b, and 700 nm d5b.

The curves of FIG. 5B may have narrower and sharper peaks than those of FIG. 5A. As the thickness of the volume Bragg grating becomes thicker, the selectivity of the incident angle, by which the incident light is diffracted, may be higher. For example, as shown in FIG. 5B, the volume Bragg grating, thickness of which is several mm, may be used as the first diffraction grating 300 (see FIGS. 3 and 4). In addition, for example, as shown in FIG. 5A, the volume Bragg grating, thickness of which is several μm to hundreds of μm, may be used as the second diffraction grating 210.

Figure 6A:
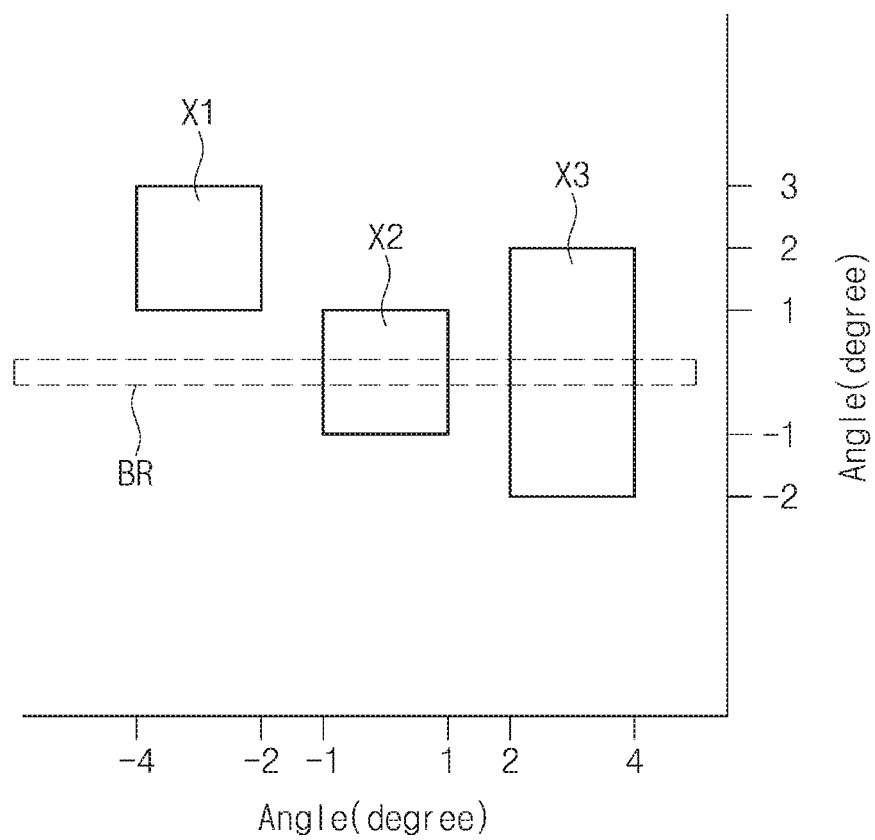
FIGS. 6A and 6B are conceptual views for explaining an image measured using a hyperspectral sensor according to embodiments of the inventive concept.
Figure 6B:
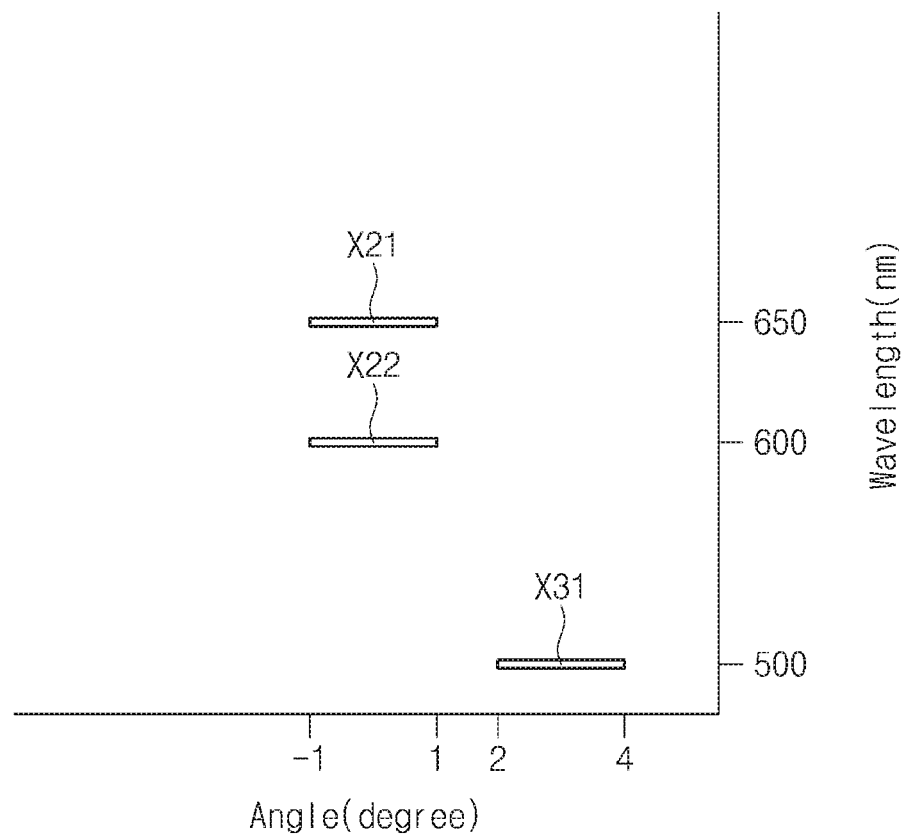

FIGS. 6A and 6B are conceptual views for explaining an image measured using a hyperspectral sensor according to embodiments of the inventive concept.

Referring to FIGS. 2A and 2B, FIG. 6A is a conceptual view for explaining an image when only the focusing optics 400 is used and the optical axis of the focusing optics 400 is matched with a reference angle, and FIG. 6B is a conceptual view for explaining an image passing through the first diffraction grating 300 and the focusing optics 400 to reach the image sensor 500. The hyperspectral sensor may be formed so that the central axis of the focusing optics 400 meets the center of the top surface 500s of the image sensor 500. The reference angle may be defined as an incident angle of light incident vertically to the horizontal direction HD and the vertical direction VD.

Referring to FIGS. 2A, 2B, and 6A, a first image X1 may be an image of light incident in ranges of about −4 degrees to about −2 degrees in the horizontal direction HD, and about +2 degrees to about +3 degrees in the vertical direction VD. In addition, the first image X1 may be the image of the incident light having about a 700-nm wavelength. A second image X2 may be an image of light incident in ranges of about −1 degree to about +1 degree in the horizontal direction HD, and about −1 degree to about +1 degree in the vertical direction VD. In addition, the second image X2 may be an image of the incident light having about 600-nm and about 650-nm wavelengths. A third image X3 may be an image of light incident in ranges of about +2 degrees to about +4 degrees in the horizontal direction HD, and about −2 degrees to about +2 degrees in the vertical direction VD. In addition, the third image X3 may be the image of the incident light beam having about a 500-nm wavelength. The entire space may be scanned while the entirety of the hyperspectral sensor according to the inventive concept moves in the vertical direction VD.

Referring to FIGS. 2A, 2B, 6A and 6B, only light incident in a range BR of about 0 degree in the vertical direction VD may be diffracted to reach the image sensor 500. Accordingly, the incident light having the incident angle corresponding to the second image X2 and having about a 650-nm wavelength may be diffracted by the first diffraction grating 300 to form a first diffraction image X21 on the image sensor 500. In addition, the incident light having the incident angle corresponding to the second image X2 and having about a 600-nm wavelength may be diffracted by the first diffraction grating 300 to form a second diffraction image X22 on the image sensor 500. In addition, the incident light having the incident angle corresponding to the third image X3 and having about a 500-nm wavelength may be diffracted by the first diffraction grating 300 to form a third diffraction image X31 on the image sensor 500. On the other hand, the incident light having the incident angle corresponding to the first image X1 and about a 700-nm wavelength may not be diffracted by the first diffraction grating 300. Accordingly, the incident light having the incident angle corresponding to the first image X1 may not reach the image sensor 500. Comparing with FIGS. 1C and 1D, the hyperspectral sensor according to the inventive concept may obtain the substantially same result as the case including the slit 12 (see FIGS. 1A and 1B).

Figure 7A:
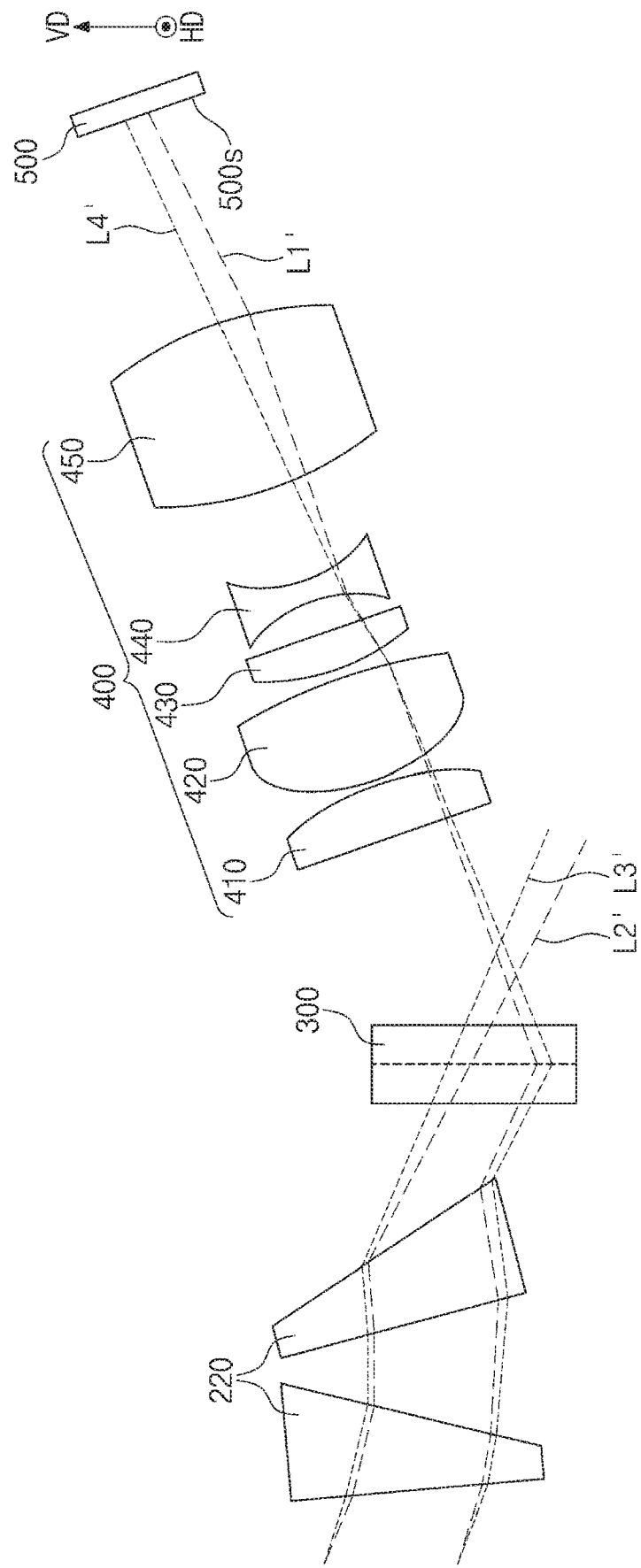
FIG. 7A is a diagram for explaining a cause of a wavelength dependent aiming angle error of a hyperspectral sensor in the spectral perspective.
Figure 7B:
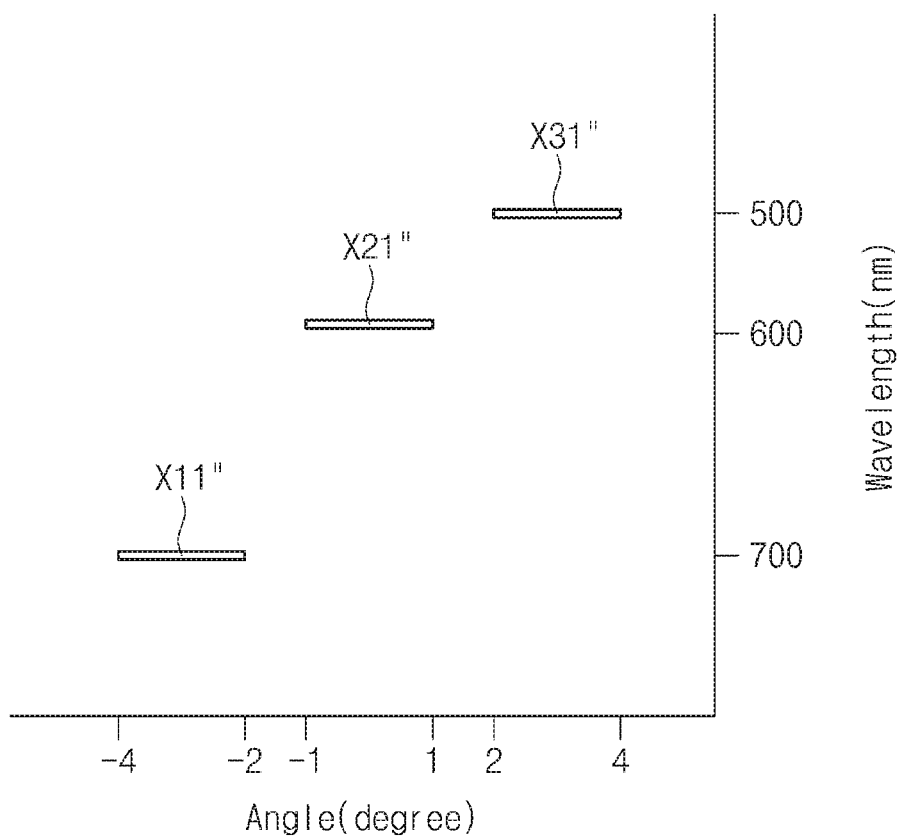
FIG. 7B is a conceptual view for explaining an image measured using the hyperspectral sensor according to FIG. 7A.

FIG. 7A is a diagram for explaining a cause of a wavelength dependent aiming angle error of a hyperspectral sensor in the spectral perspective. FIG. 7B is a conceptual view for explaining an image measured using the hyperspectral sensor according to FIG. 7A.

The cause of the wavelength dependent aiming angle error will be described using the hyperspectral sensor including two prisms 220 with reference to FIG. 7A. For example, first light L1' and second light L2' may have about a 600-nm wavelength, and third light L3' and fourth light L4' may have about a 700-nm wavelength. The first light L1' and the third light L3' may be incident at the reference angle, and the second light L2' and fourth light L4' may be incident at an angle deviated by about 2.3 degrees from the reference angle.

The first light L1' and the fourth light L4' may pass through the two prisms 220 to satisfy the Bragg condition in the first diffraction grating 300. The first light L1' and the fourth light L4' satisfying the Bragg condition and diffracted in the first diffraction grating 300 may pass through the focusing optics 400 to reach the image sensor 500. An error caused by the fourth light L4', which has not been incident at the reference angle and reached the image sensor 500, may be defined as the wavelength dependent aiming angle error. Due to the wavelength dependent aiming angle error, the hyperspectral sensor may obtain images at different positions according to a wavelength. In other words, an image distortion may occur due to the wavelength dependent aiming angle error. A permissible magnitude of the wavelength dependent aiming angle error may be determined by spatial resolution required in a direction in which the hyperspectral sensor scans. According to an embodiment of the inventive concept, moderate magnitude of the wavelength dependent aiming angle error may be corrected after scanning by means of the hyperspectral sensor.

Referring to FIGS. 6A, 7A, and 7B, the incident light having the incident angle corresponding to the second image X1 and about the 700-nm wavelength may be diffracted by the first diffraction grating 300 to form a first diffraction image X11" on the image sensor 500. The incident light having the incident angle corresponding to the second image X2 and about the 600-nm wavelength may be diffracted by the first diffraction grating 300 to form a second diffraction image X21" on the image sensor 500. In addition, the incident light having the incident angle corresponding to the third image X3 and about the 500 nm wavelength may be diffracted by the first diffraction grating 300 to form a third diffraction image X31" on the image sensor 500.

Comparing FIGS. 6B and 7B, the first diffraction image X11" may appear which is formed by the incident light having about the 700-nm wavelength, but does not appear in FIG. 6B because the light has not been incident at the reference angle. The first diffraction image X11" may be caused by the wavelength dependent aiming angle error due to the structure of FIG. 7A.

When the magnitude of the wavelength dependent aiming angle error of the hyperspectral sensor is measured, the error may be corrected to use the hyperspectral sensor. For example, the hyperspectral sensor in a push broom manner may obtain multiple images while scanning the space. Referring to FIGS. 6A and 7A, when the hyperspectral sensor moves by about +2.3 degrees in the vertical direction VD, the range BR of 0 degree also moves by about +2.3 degrees to be positioned at the center of the first image X1.

When an image from the hyperspectral sensor before movement is assumed to be a first frame, and an image after movement by about +2.3 degrees is assumed to be a second frame, a third diffraction image X31" may be formed in the first frame as shown in FIG. 7B, and the third diffraction image X31" may not be formed in the second frame. When there is no wavelength dependent aiming angle error, the third diffraction image X31" may be formed in the second frame, and may not be formed in the first frame. When it is known that there is an aiming angle error of about 2.3 degrees at about the 700-nm wavelength, the wavelength dependent aiming angle error may be corrected by moving the image in about the 700-nm wavelength band to the second frame by about 2.3 degrees, and then deleting the image in the first frame. For another wavelength band, images may be corrected by moving a frame by a corresponding wavelength dependent aiming angle error.

Figure 8A:
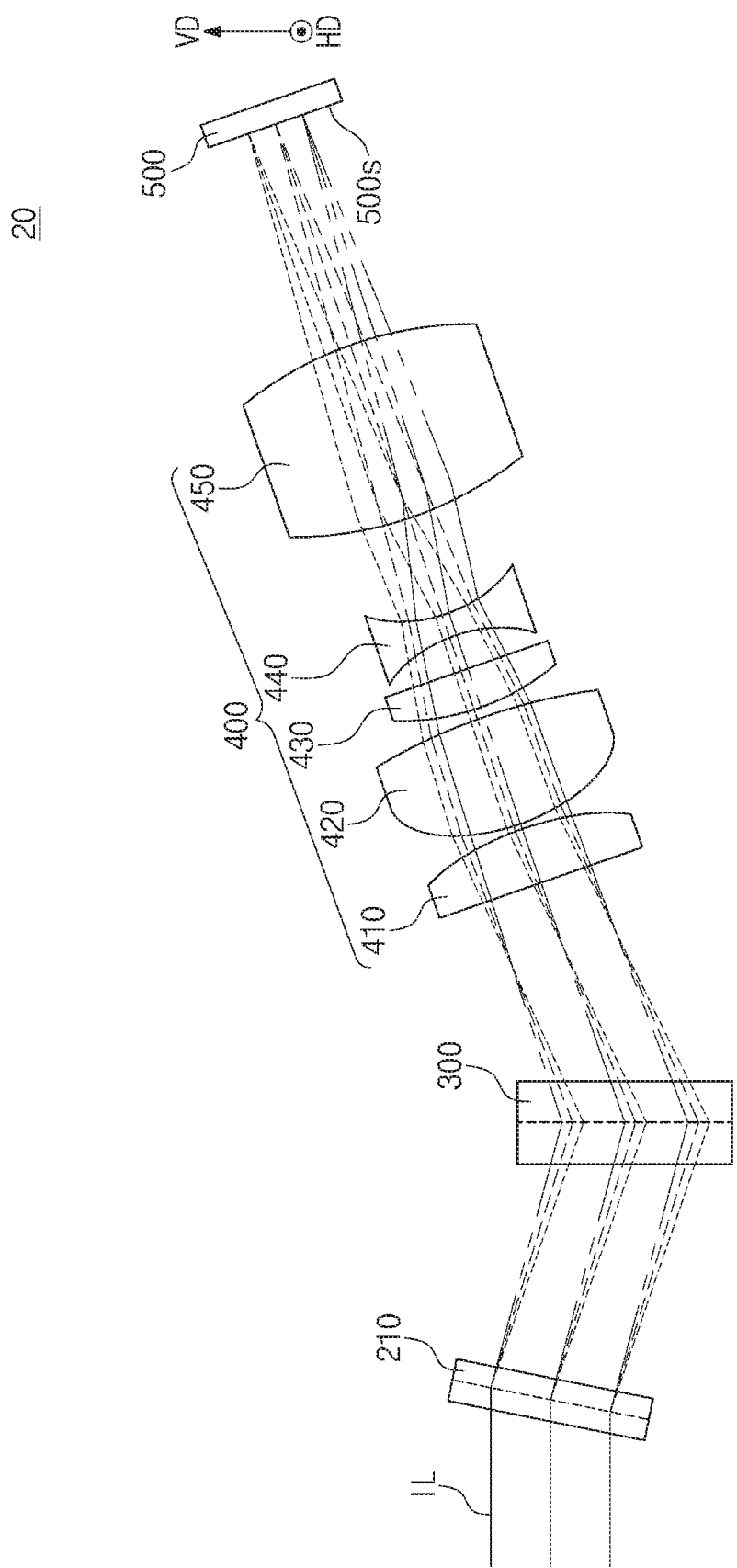
Figure 8B:
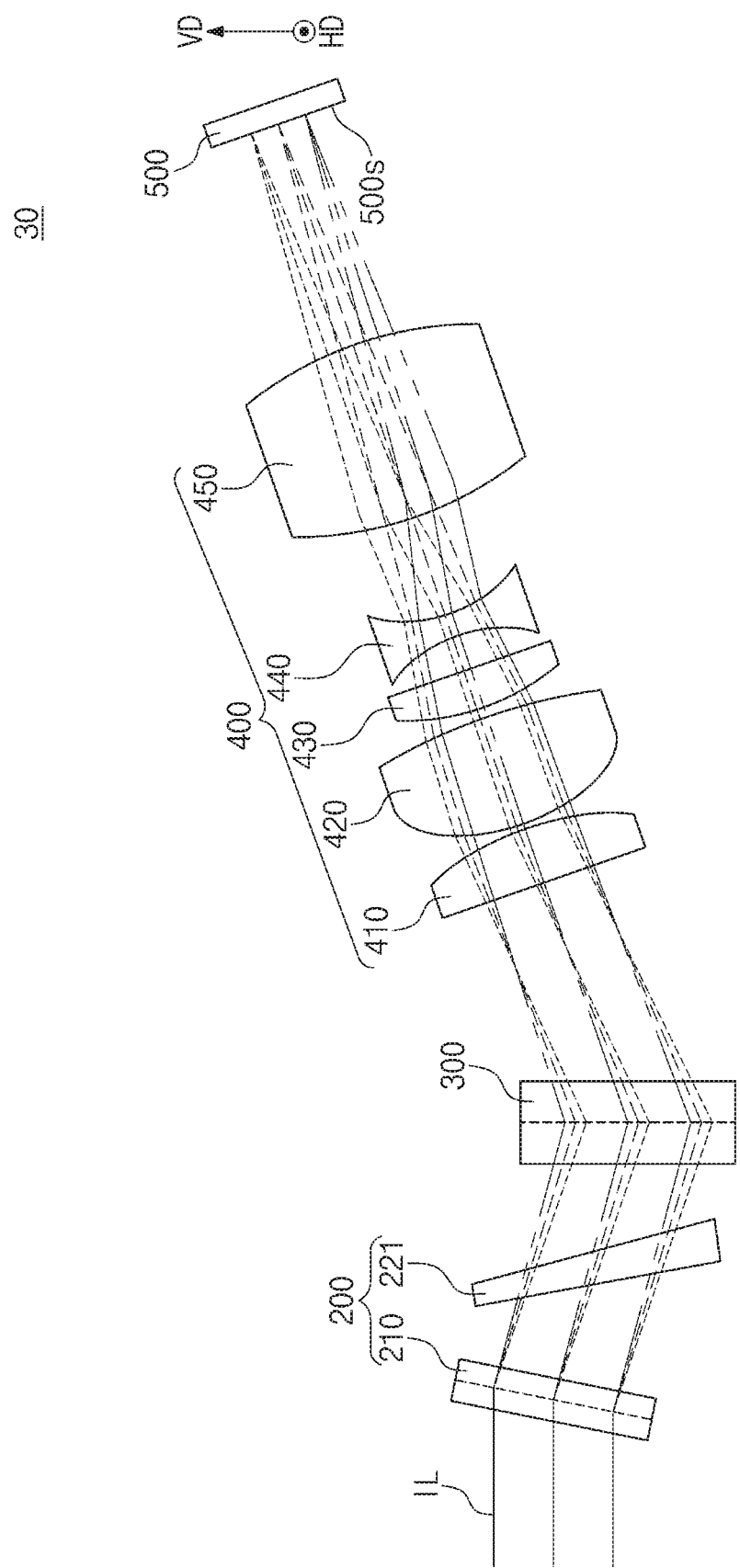
Figure 9A:
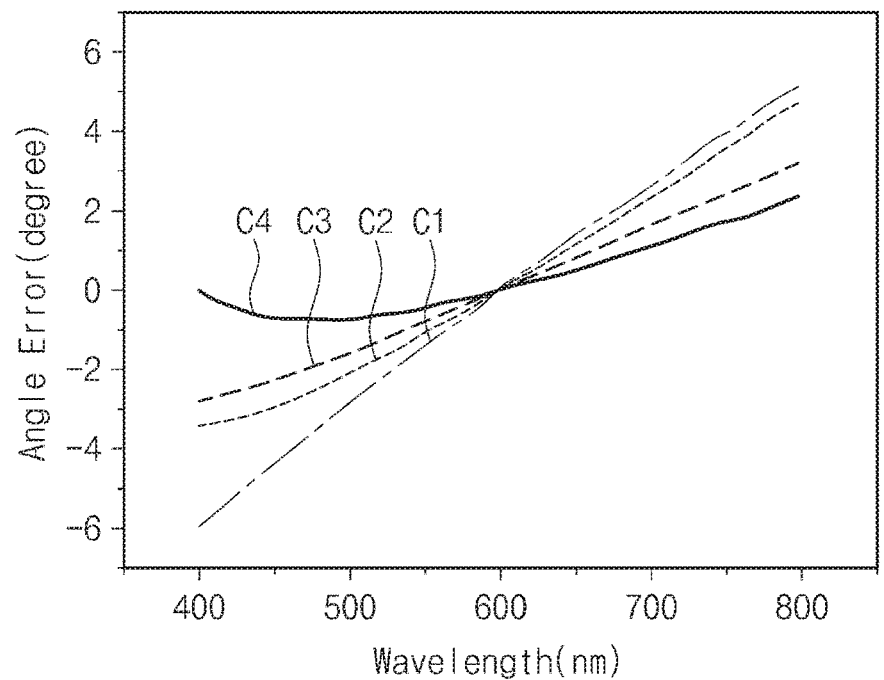
FIGS. 9A and 9B are graphs for comparing wavelength dependent aiming angle errors according to the number of prisms in a hyperspectral sensor according to embodiments of the inventive concept.
Figure 9B:
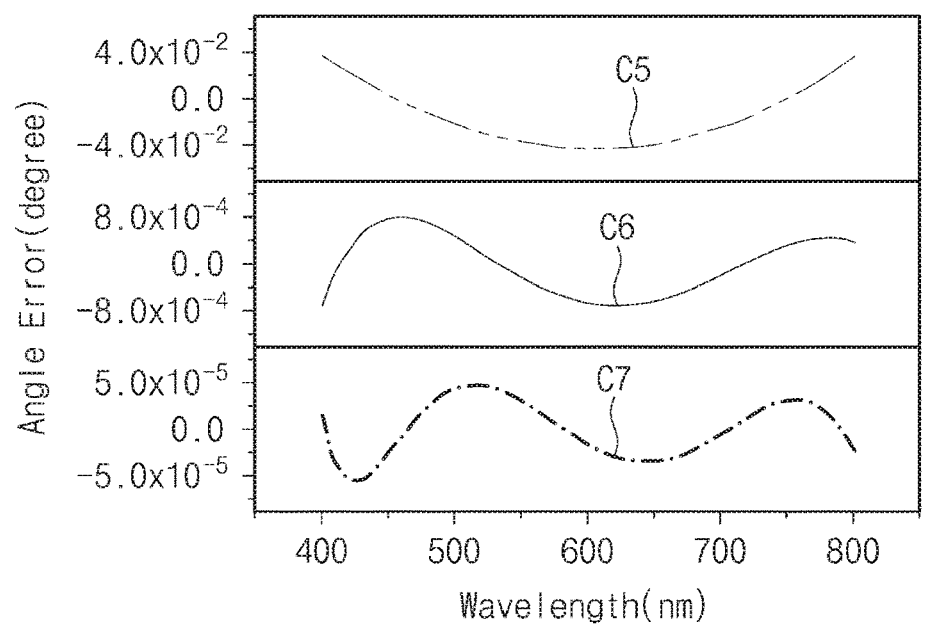

FIGS. 8A and 8B are spectral diagrams for explaining the structure of the hyperspectral sensor according to other embodiments of the inventive concept. In FIGS. 8A and 8B, different kinds of lines mean light beams of different wavelengths. FIGS. 9A and 9B are graphs for comparing wavelength dependent aiming angle errors according to the number of prisms in a hyperspectral sensor according to embodiments of the inventive concept. Hereinafter, for the sake of clarity of explanation, a repeated description of those described above will be omitted Referring to FIG. 8A, a hyperspectral sensor 20 according to another embodiment of the inventive concept may not include a prism between the second diffraction grating 210 and the first diffraction grating 300. In other words, the incident light IL dispersed through the second diffraction grating 210 may be immediately incident to the first diffraction grating 300. In addition, referring to FIG. 8B, a hyperspectral sensor 30 according to another embodiment of the inventive concept may include a first sub-prism 221 between the second diffraction grating 210 and the first diffraction grating 300. In other words, the incident light IL dispersed through the second diffraction grating 210 and the first sub-prism 221 may be incident to the first diffraction grating 300.

Like the hyperspectral sensor according to FIG. 7A, a hyperspectral optics may be composed by omitting the second diffraction grating 210, and arranging only a prism between the first diffraction grating 300 and a detection object. Referring to FIG. 9A, first to fourth curves C1 to C4 show wavelength dependent aiming angle errors when the numbers of prisms between the first diffraction grating 300 and the detection object are respectively 1 to 4. More specifically, when a reference wavelength is determined to be about 600 nm, the first to fourth curves C1 to C4 show that an absolute value of the angle error may be larger, as the wavelength gets smaller or larger than about 600 nm. When the wavelength of the incident light is the same, as proceeding from the first curve C1 to the fourth curve C4, namely, as the number of prisms gets increased, the absolute value of the angle error may be smaller.

Referring to FIGS. 8A, 8B, and 9B, fifth to seventh curves C5 to C7 show wavelength dependent aiming angle errors in a wavelength range between about 400 nm to 800 nm, when the second diffraction grating 210 is included and the numbers of the prisms between the second diffraction grating 210 and the first diffraction grating 300 are respectively 0, 1, and 2. More specifically, the fifth curve C5 is a case of including only the second diffraction grating 210 without a prism, and shows the angle error of about $-4.0 \times 10^{-2}$ degrees to about $+4.0 \times 10^{-2}$ degrees. In addition, the sixth curve C6 is a case of including one prism and the second diffraction grating 210, and shows the angle error of about $-8.0 \times 10^4$ degrees to about $+8.0 - 10^{-4}$ degrees. In addition, the seventh curve C7 is a case of including two prisms and the second diffraction grating 210, and shows the angle error of about $-5.0 \times 10^{-5}$ degrees to about $+5.0 \times 10^{-5}$ degrees. Comparing FIGS. 9B and 9A, the angle error in a case of including the second diffraction grating 210 may be smaller than that in a case where the second diffraction grating 210 is omitted. In addition, comparing the fifth to seventh curves C5 to C7 of FIG. 9B, the angle error in a case of further including one or two prisms may be smaller than a case only including the second diffraction grating 210.

Figure 10:
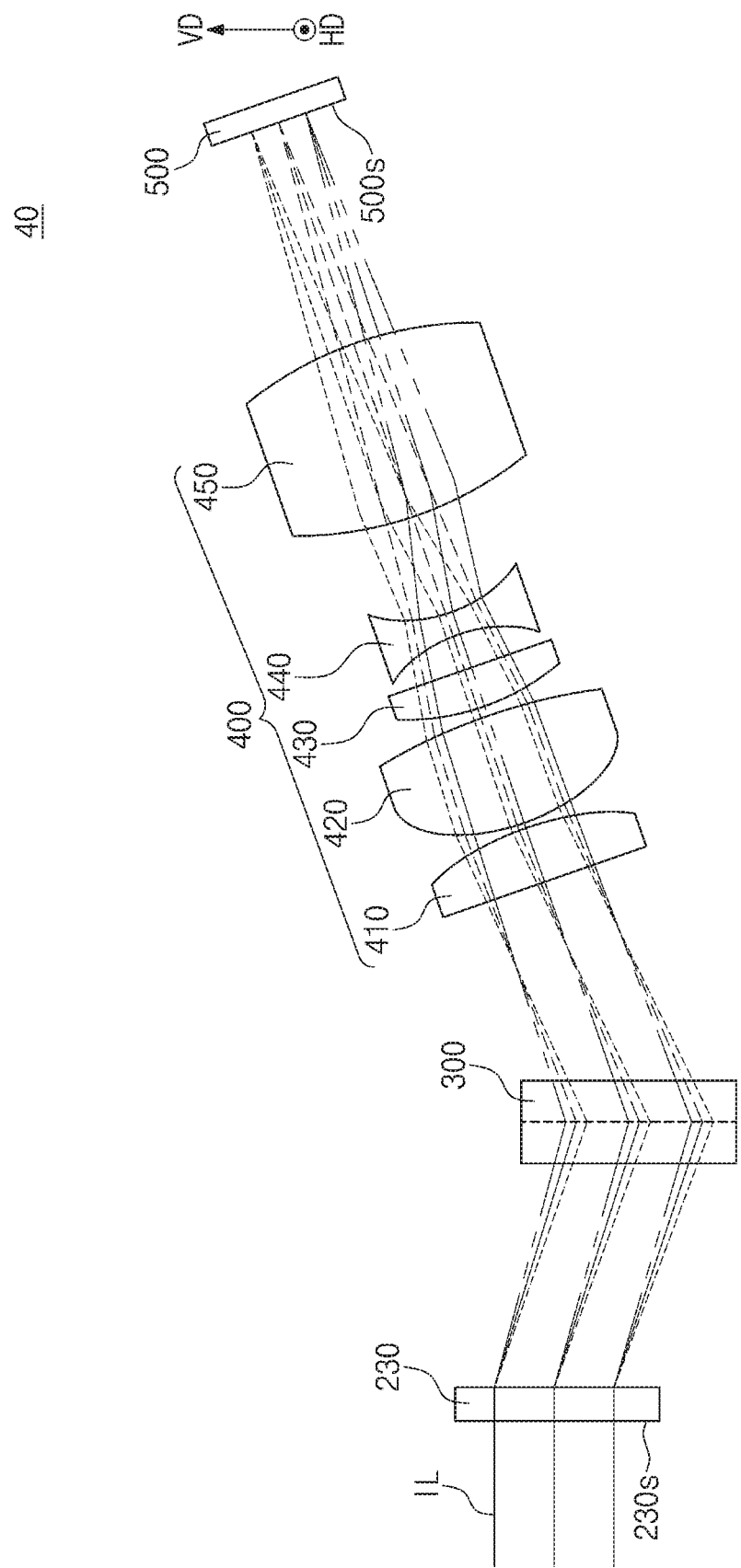

FIG. 10 is a spectral diagram for explaining the structure of a hyperspectral sensor according to embodiments of the inventive concept. Different kinds of lines in FIG. 10 mean light beams of different wavelengths. Hereinafter, for the sake of clarity of explanation, a repeated description of those described above will be omitted Referring to FIG. 10, a hyperspectral sensor 40 according to another embodiment of the inventive concept may include a vertical incidence grating 230. The vertical incidence grating 230 may be spaced apart from the first diffraction grating 300. In addition, the vertical incidence grating 230 may be disposed substantially parallel with the first diffraction grating 300. The vertical incidence grating 230 may have, for example, a sawtooth-shaped profile. For example, when the vertical incidence grating 230 is disposed parallel with the first diffraction grating 300, the period of the vertical incidence grating 230 is required to double the grating period GP (see FIG. 4) of the first diffraction grating 300 so as to satisfy the Bragg condition. When the period of the vertical incidence grating 230 is double the grating period GP of the first diffraction grating 300, light beams of all the wavelengths, which are vertically incident to the vertical incidence grating 230, may satisfy the Bragg condition in the first diffraction grating 300.

Figure 11A:
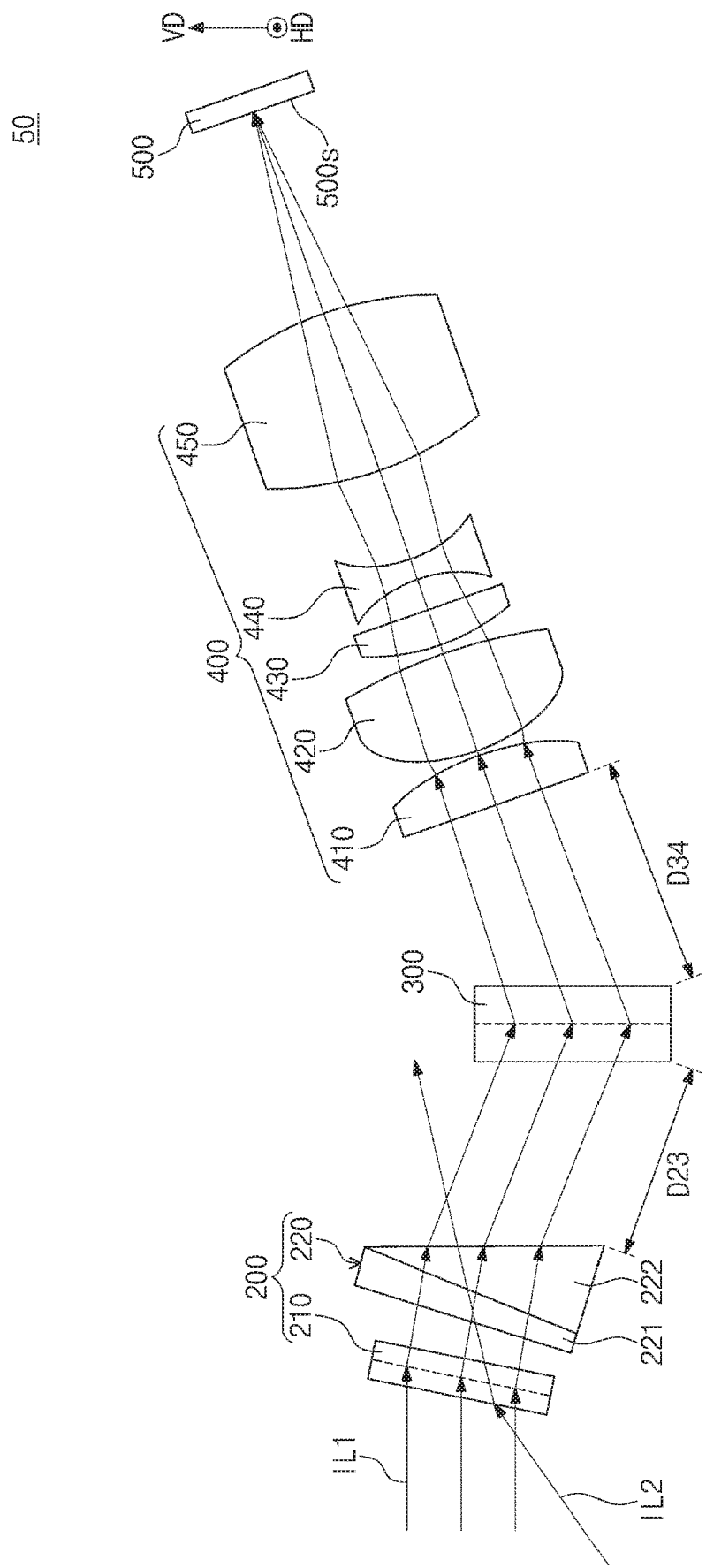
Figure 11B:
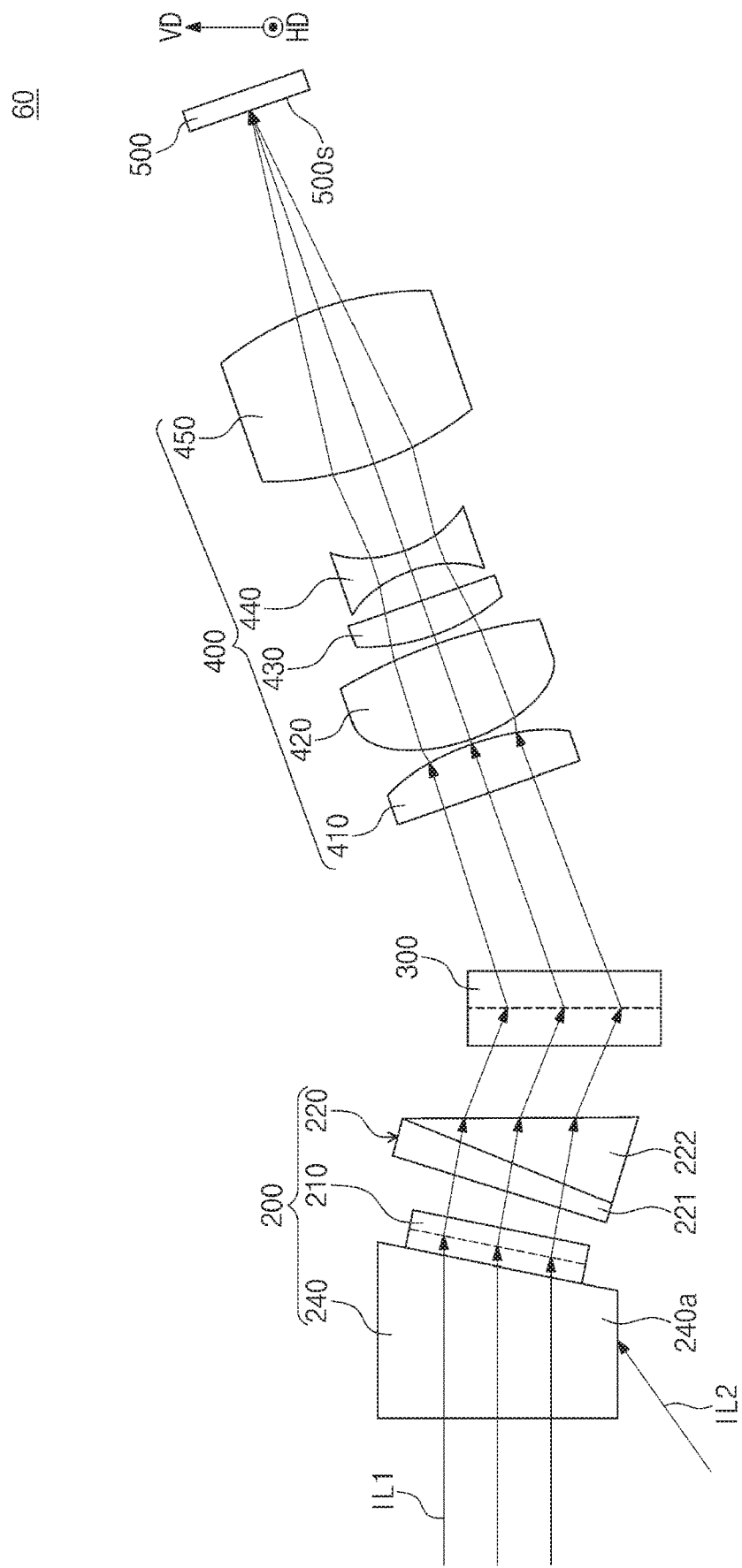

FIGS. 11A and 11B are spectral diagrams for explaining the structure of the hyperspectral sensor according to embodiments of the inventive concept. Hereinafter, for the sake of clarity of explanation, a repeated description of those described above will be omitted Referring to FIG. 11A, when compared with the hyperspectral sensor 10 in FIG. 3, the hyperspectral sensor 50 according to another embodiment of the inventive concept may have a larger distance D23 between the spectral angle converting unit 200 and the first diffraction grating 300. More specifically, the distance D23 between the spectral angle converting unit 200 and the first diffraction grating 300 may be larger or equal to the distance D34 between the first diffraction grating 300 and the focusing optics 400. In addition, the distance between the second diffraction grating 210 and the first diffraction grating 300 may be larger than the distance between the first diffraction grating 300 and the focusing optics 400. Accordingly, even when passing through the spectral angle converting unit 200, the second incident light IL2 may not reach the image sensor 500. The second incident light IL2 may be incident at an inclined angle with respect to the first incident light IL1.

Referring to FIG. 11B, the spectral angle converting unit 200 of a hyperspectral sensor 60 according to another embodiment of the inventive concept may include a duct 240 for covering the second diffraction grating 210 in addition to the second diffraction grating 210 and the prism 220. The duct 240 may have a hollow hexahedral shape in which a light traveling path of the first incident light IL1 is perforated. The duct 240 may cut off a portion of the incident light to decrease the viewing angle. For example, the side wall 240a of the duct 240 may cut off the second incident light IL2 incident at an inclined angle with respect to the first incident light IL1.

The hyperspectral sensors 50 and 60 according to FIGS. 11A and 11B may commonly prevent a portion of light, which are not diffracted through the first diffraction grating 300, from reaching the top surface 500s of the image sensor 500. In other words, zero-th order diffracted light, which are not diffracted through the first diffraction grating 300, are prevented from reaching the top surface 500s of the image sensor 500, and thus a sharper image may be acquired.

Unlike the illustrated, the spectral angle converting unit 200 of the hyperspectral sensor 60 in FIG. 11B may include a telescope having an afocal system composed of two or more lenses or mirrors instead of the duct 240. The afocal system of the telescope may amplify small angle differences between incident light beams. Accordingly, when the telescope is arranged in one side surface of the spectral angle converting unit 200, the viewing angle may be decreased, and the zero-th-order diffraction light components may be cut off. For example, the telescope may include a cylindrical lens having a vertical curvature or an anamorphic optics including a mirror. The anamorphic optics, which has the vertical curvature and does not have a horizontal curvature, may only decrease a vertical viewing angle.

The viewing angle may increase when the telescope, which includes the afocal system composed of two or more lenses or mirrors instead of the duct 240, is arranged in opposition to the arrangement for decreasing the viewing angle. For example, when a telescope including an anamorphic optics having only a horizontal curvature is arranged in opposition to arrangement for decreasing the viewing angle, a horizontal viewing angle of the hyperspectral sensor may increase.

The hyperspectral sensor according to embodiments of the inventive concept may be simplified by including only one component having a focal distance, and thus the manufacturing and arrangement may be easy.

In addition, the hyperspectral sensor according to embodiments of the inventive concept may minimize a wavelength dependent aiming angle error through a spectral angle converting unit including a grating and a prism.

Although the exemplary embodiments of the present invention have been described, it is understood that the present invention may be implemented as other concrete forms without changing the inventive concept or essential features. Therefore, these embodiments as described above are only proposed for illustrative purposes and do not limit the present disclosure.

What is claimed is:
1. A hyperspectral sensor comprising:
a spectral angle converting unit configured to convert an angle of incident light differently according to a wavelength;
a diffraction unit configured to selectively diffract the incident light according to an incident angle and a wavelength;
a focusing optics comprising at least one lens, and configured to collect diffracted light passing through the diffraction unit; and
an image sensor configured to acquire an image passing through the focusing optics and formed on a focal plane,
wherein the spectral angle converting unit comprises a diffraction grating and at least one prism, wherein the diffraction unit comprises a volume Bragg grating having a periodic refractive index distribution therein, and wherein the diffraction grating of the spectral angle converting unit and the volume Bragg grating of the diffraction unit have different lengths or different thicknesses.

2. The hyperspectral sensor of claim 1, wherein the diffraction grating of the spectral angle converting unit has a periodic refractive index distribution therein.

3. The hyperspectral sensor of claim 2, wherein the diffraction grating of the spectral angle converting unit comprises first parts having a film shape and second parts between the first parts, wherein the first parts and the second parts are disposed alternately, an average refractive index of the first parts is greater than an average refractive index of the second parts, a refractive index difference between the first parts and the second parts is equal to or greater than 0.01, and a length of the diffraction grating of the spectral angle converting unit is equal to or smaller than 50 μm.

4. The hyperspectral sensor of claim 1, wherein the volume Bragg grating comprises first parts having a film shape and second parts between the first parts, wherein the first parts and the second parts are disposed alternately, and an average refractive index of the first parts is greater than an average refractive index of the second parts.

5. The hyperspectral sensor of claim 4, wherein a refractive index difference between the first parts and the second parts is equal to or smaller than $10^{-3}$, and a length of the volume Bragg grating is equal to or greater than 0.5 mm.

6. The hyperspectral sensor of claim 1, the diffraction grating of the spectral angle converting unit and the volume Bragg grating of the diffraction unit are disposed parallel to each other.

7. The hyperspectral sensor of claim 6, wherein the diffraction grating of the spectral angle converting unit comprises periodic protruding parts on a surface thereof.

8. The hyperspectral sensor of claim 1, wherein the hyperspectral sensor scans an image of a space while proceeding in one direction, and a wavelength dependent aiming angle error occurring in the hyperspectral sensor is corrected after the scanning.

9. The hyperspectral sensor of claim 1, further comprising:

a duct having a hollow hexahedral shape and configured to cover one side surface of the spectral angle converting unit.

10. A hyperspectral sensor comprising:

a spectral angle converting unit comprising a diffraction grating;

an image sensor spaced apart from the spectral angle converting unit;

a diffraction unit disposed between the spectral angle converting unit and the image sensor, and comprising a volume Bragg grating; and a focusing optics disposed between the diffraction unit and the image sensor, and comprising a lens or a reflective mirror, wherein the volume Bragg grating has a periodic refractive index distribution therein, wherein a central axis of the volume Bragg grating and a central axis of the focusing optics do not coincide and form a predetermined angle with each other, and wherein the diffraction grating of the spectral angle converting unit and the volume Bragg grating of the diffraction unit have different lengths or different thicknesses.

11. A hyperspectral sensor comprising:

a spectral angle converting unit comprising a diffraction grating;

an image sensor spaced apart from the spectral angle converting unit;

a diffraction unit disposed between the spectral angle converting unit and the image sensor, and comprising a volume Bragg grating; and a focusing optics disposed between the diffraction unit and the image sensor, and comprising a lens or a reflective mirror, wherein the volume Bragg grating has a periodic refractive index distribution therein, wherein a central axis of the volume Bragg grating and a central axis of the focusing optics do not coincide and form a predetermined angle with each other, wherein the diffraction grating of the spectral angle converting unit and the volume Bragg grating of the diffraction unit are disposed parallel to each other, and the diffraction grating of the spectral angle converting unit comprises periodic protruding parts on a surface thereof.

12. The hyperspectral sensor of claim 10, further comprising:

a duct having a hollow hexahedral shape and configured to cover one side surface of the spectral angle converting unit.

* * * * *